US010367989B2

(12) United States Patent
Tanaka

(10) Patent No.: US 10,367,989 B2
(45) Date of Patent: Jul. 30, 2019

(54) IMAGING DEVICE AND FOCUSING CONTROL METHOD

(71) Applicant: FUJIFILM Corporation, Tokyo (JP)

(72) Inventor: Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/219,498

(22) Filed: Jul. 26, 2016

(65) Prior Publication Data
US 2016/0337579 A1 Nov. 17, 2016

Related U.S. Application Data
(63) Continuation of application No. PCT/JP2014/077318, filed on Oct. 14, 2014.

(30) Foreign Application Priority Data

Feb. 7, 2014 (JP) ................................ 2014-022468

(51) Int. Cl.
H04N 5/232 (2006.01)
G02B 7/34 (2006.01)
(Continued)

(52) U.S. Cl.
CPC ........... H04N 5/23212 (2013.01); G02B 7/09 (2013.01); G02B 7/34 (2013.01); H04N 5/23254 (2013.01); H04N 5/3696 (2013.01); G03B 13/36 (2013.01)

(58) Field of Classification Search
None
See application file for complete search history.

(56) References Cited

U.S. PATENT DOCUMENTS 4,792,821 A 12/1988 Akashi
5,003,338 A * 3/1991 Takagi ................ G02B 7/34
396/110
(Continued)

FOREIGN PATENT DOCUMENTS

JP 63-172239 A 7/1988
JP 7-97173 B2 10/1995
(Continued)

OTHER PUBLICATIONS

English Translation of International Preliminary Report on Patentability (including PCT/IB/373 and PC/ISA/237) for PCT/JP2014/076946, dated Aug. 9, 2016.
(Continued)

Primary Examiner — Roberto Velez
Assistant Examiner — Quan Pham
(74) Attorney, Agent, or Firm — Birch, Stewart, Kolasch & Birch, LLP

(57) ABSTRACT

A digital camera includes a focusing-control-unit that calculates a defocus amount using detection signals of phase difference detection pixels and drives a focus lens according to the defocus amount, and a movement-detection-unit that detects whether a movement is present in a captured subject-image. The focusing-control-unit calculates the defocus amount according to an auto-focus instruction, and drives, in a case where the defocus amount exceeds a threshold-value, the focus lens according to the defocus amount and then performs the phase difference AF again to complete auto-focusing. Further, in a case where the defocus amount is equal to or smaller than the threshold-value, the focusing control unit performs the phase difference AF only once to complete the auto-focusing. Further, in a case where a movement is present in the subject-image, the focusing-
(Continued)

control-unit sets the threshold to a larger value than in a case where a movement is not present in the subject-image.

19 Claims, 15 Drawing Sheets

(51) Int. Cl.
*H04N 5/369* (2011.01)
*G02B 7/09* (2006.01)
*G03B 13/36* (2006.01)

(56) References Cited

U.S. PATENT DOCUMENTS

| | | | | |
|---|---|---|---|---|
| 5,208,625 | A * | 5/1993 | Suekane | G02B 7/28 396/111 |
| 2013/0250162 | A1 | 9/2013 | Sasaki | |
| 2015/0124157 | A1 * | 5/2015 | Hongu | G03B 13/36 348/353 |

FOREIGN PATENT DOCUMENTS

| | | |
|---|---|---|
| JP | 2006-91915 A | 4/2006 |
| JP | 2010-271499 A | 12/2010 |
| JP | 2012-4729 A | 1/2012 |
| JP | 2012-128316 A | 7/2012 |
| JP | 2013-97136 A | 5/2013 |
| JP | 2013-228571 A | 11/2013 |

OTHER PUBLICATIONS

Japanese Notification of Reasons for Refusal dated Jul. 4, 2017, for corresponding Japanese Application No. 2015-561155, with an English translation.

International Search Report, issued in PCT/JP2014/077318, PCT/ISA/210, dated Nov. 25, 2014.

Written Opinion of the International Searching Authority, issued in PCT/JP2014/077318, PCT/ISA/237, dated Nov. 25, 2014.

* cited by examiner

IMAGING DEVICE AND FOCUSING CONTROL METHOD

CROSS-REFERENCE TO RELATED APPLICATIONS

This application is a Continuation of PCT International Application No. PCT/JP2014/077318 filed on Oct. 14, 2014, which claims priority under 35 U.S.C § 119(a) to Japanese Patent Application No. 2014-022468 filed Feb. 7, 2014. Each of the above application(s) is hereby expressly incorporated by reference, in its entirety, into the present application.

BACKGROUND OF THE INVENTION

1. Field of the Invention

The present invention relates to an imaging device and a focusing control method.

2. Description of the Related Art

In recent years, according to the increase in resolution of an imaging element such as a charge coupled device (CCD) image sensor or a complementary metal oxide semiconductor (CMOS) image sensor, demand for information devices having an imaging function, such as a digital still camera, a digital video camera, a mobile phone such as a smart phone, or a personal digital assistant (PDA) has rapidly increased. Such an information device having an imaging function is referred to as an imaging device.

In such an imaging device, as a focusing control method for focusing on a main subject, a contrast auto-focus (AF) method (for example, see JP2006-91915A) or a phase difference AF method (for example, see JP2012-4729A) is employed.

In an imaging device disclosed in JP2006-91915A, when a moving body is included in a subject, an AF evaluation area is enlarged to increase a probability that the moving body will enter the AF evaluation area, such that auto-focusing can be performed while the moving body is tracked.

SUMMARY OF THE INVENTION

In the phase difference AF method, outputs of a pair of sensor rows for phase difference detection are received as data, and a correlation of the outputs of the pair of sensors is obtained. Specifically, when data of one sensor row is "A[1], . . . , and A[k]", data of the other sensor row is "B[1], . . . , and B[k]", and when two pieces of data are deviated from each other by "d", a value of "d" when an area S[d] surrounded by two data waveforms calculated by the following expression becomes a minimum is calculated as a phase difference amount, and a focus lens is driven based on the phase difference amount.

The focus lens may be an entire imaging lens, or may be a part of plural lenses. Hereinafter, to perform phase difference AF means to calculate a defocus amount and to drive a focus lens based on the calculated defocus amount.

$$S[d] = \sum_{n=1}^{k}(A[n+d]-B[n])^2 \quad (1)$$

$$d = -L, \ldots, -2, -1, 0, 1, 2, \ldots, L$$

Further, in the phase difference AF method, a lens driving amount (defocus amount) up to a focusing point is calculated based on the calculated phase difference amount as described above.

FIG. 17 is a diagram illustrating a defocus amount calculation method based on the phase difference AF method.

As shown in FIG. 17, a distance between an image-forming surface where a main subject P is formed as an image by an imaging lens 1A and an imaging surface of an imaging element 5A is represented as a defocus amount x, a phase difference amount calculated by Expression (1) is represented as y, and an incident angle of light incident onto the image-forming surface from the main subject P is represented as θ. Further, an optical opening diameter of the imaging lens 1A is represented as R, and a distance from the imaging lens 1A to the image-forming surface is represented as f.

In FIG. 17, a relationship of tan(θ)=R/2f=y/2x is established. Further, since an F value of the imaging lens 1A is in a relationship of "F value=2/tan(θ)", tan(θ)=2/(F value) is obtained. Accordingly, 2/(F value)=y/2x, and accordingly, the defocus amount x becomes x=y*(F value)/4.

Here, since the phase difference amount y has a limit in detection accuracy, in a case where the phase difference amount y is smaller than a maximum detectable value, the defocus amount x and the phase difference amount y have a linear relationship therebetween.

However, in a situation where the phase difference amount y becomes a large value which cannot be detected, since the defocus amount x becomes a value when the phase difference amount y is the maximum value, linearity between an actual phase difference amount and a defocus amount breaks down, which causes an error in the amount of lens driving.

Accordingly, when the phase difference amount calculated according to an auto-focus execution instruction (hereinafter, referred to as an auto-focus instruction) is large, it is preferable to move the lens to a focusing position based on the phase difference amount, and then, to perform the phase difference AF again to prevent an error in a lens position due to deviation in linearity.

However, in a case where the phase difference AF is performed plural times after the auto-focus instruction is given as described above, if the main subject moves, the subject image may change while the phase-difference AF after the second phase-difference AF is being performed, and thus, a desired image may not be obtained, and a shooting opportunity may be missed.

Since the imaging device disclosed in JP2006-91915A relates to a contrast AF method, it is possible to secure the accuracy of auto-focusing without performing auto-focusing plural times with respect to an auto-focus instruction. Thus, the above-mentioned problem with respect to a probability of missing a shooting opportunity is not considered.

In order to solve the above-mentioned problems, an object of the invention is to provide an imaging device and a focusing control method capable of enhancing the accuracy of a phase difference AF and reducing a probability of missing a shooting opportunity.

According to an aspect of the invention, there is provided an imaging device comprising: an imaging element that includes a first signal detection unit that detects a signal based on one beam among a pair of beams that passes through different portions in a pupil region of an imaging optical system including a focus lens, and a second signal detection unit that detects a signal based on the other beam among the pair of beams, and images a subject through the imaging optical system; a focusing control unit that calculates a defocus amount using a detection signal of the first signal detection unit and a detection signal of the second signal detection unit and drives the focus lens according to the defocus amount; and a movement detection unit that detects whether a movement is present in a subject image captured by the imaging element. The focusing control unit calculates the defocus amount according to an auto-focus execution instruction, and drives, in a case where the defocus amount exceeds a threshold value, the focus lens according to the defocus amount and then performs the calculation of the defocus amount using the detection signal of the first signal detection unit and the detection signal of the second signal detection unit and the driving of the focus lens according to the defocus amount again to complete auto-focusing. Further, in a case where the defocus amount calculated according to the execution instruction is equal to or smaller than the threshold value, the focusing control unit drives the focus lens according to the defocus amount to complete the auto-focusing. In a case where a movement is present in the subject image, the focusing control unit sets the threshold value to a larger value than in a case where a movement is not present in the subject image.

According to another aspect of the invention, there is provided a focusing control method comprising: a focusing control step of calculating a defocus amount using a detection signal of the first signal detection unit and a detection signal of the second signal detection unit output from an imaging element that includes a first signal detection unit that detects a signal based on one beam among a pair of beams that passes through different portions in a pupil region of an imaging optical system including a focus lens and a second signal detection unit that detects a signal based on the other beam among the pair of beams, and images a subject through the imaging optical system, and driving the focus lens according to the defocus amount; and a movement detection step of detecting whether a movement is present in a subject image captured by the imaging element. In the focusing control step, the defocus amount is calculated according to an auto-focus execution instruction, and in a case where the defocus amount exceeds a threshold value, the focus lens is driven according to the defocus amount and then the calculation of the defocus amount using the detection signal of the first signal detection unit and the detection signal of the second signal detection unit and the driving of the focus lens are performed again according to the defocus amount to complete auto-focusing. Further, in the focusing control step, in a case where the defocus amount calculated according to the execution instruction is equal to or smaller than the threshold value, the focus lens is driven according to the defocus amount to complete the auto-focusing. Furthermore, in the focusing control step, in a case where a movement is present in the subject image, the threshold value is set to a larger value than in a case where a movement is not present in the subject image.

According to the invention, it is possible to provide an imaging device and a focusing control method capable of enhancing the accuracy of a phase difference AF and reducing a probability of missing a shooting opportunity.

DESCRIPTION OF THE PREFERRED EMBODIMENTS

Hereinafter, embodiments of the invention will be described with reference to the accompanying drawings.

Figure 1:
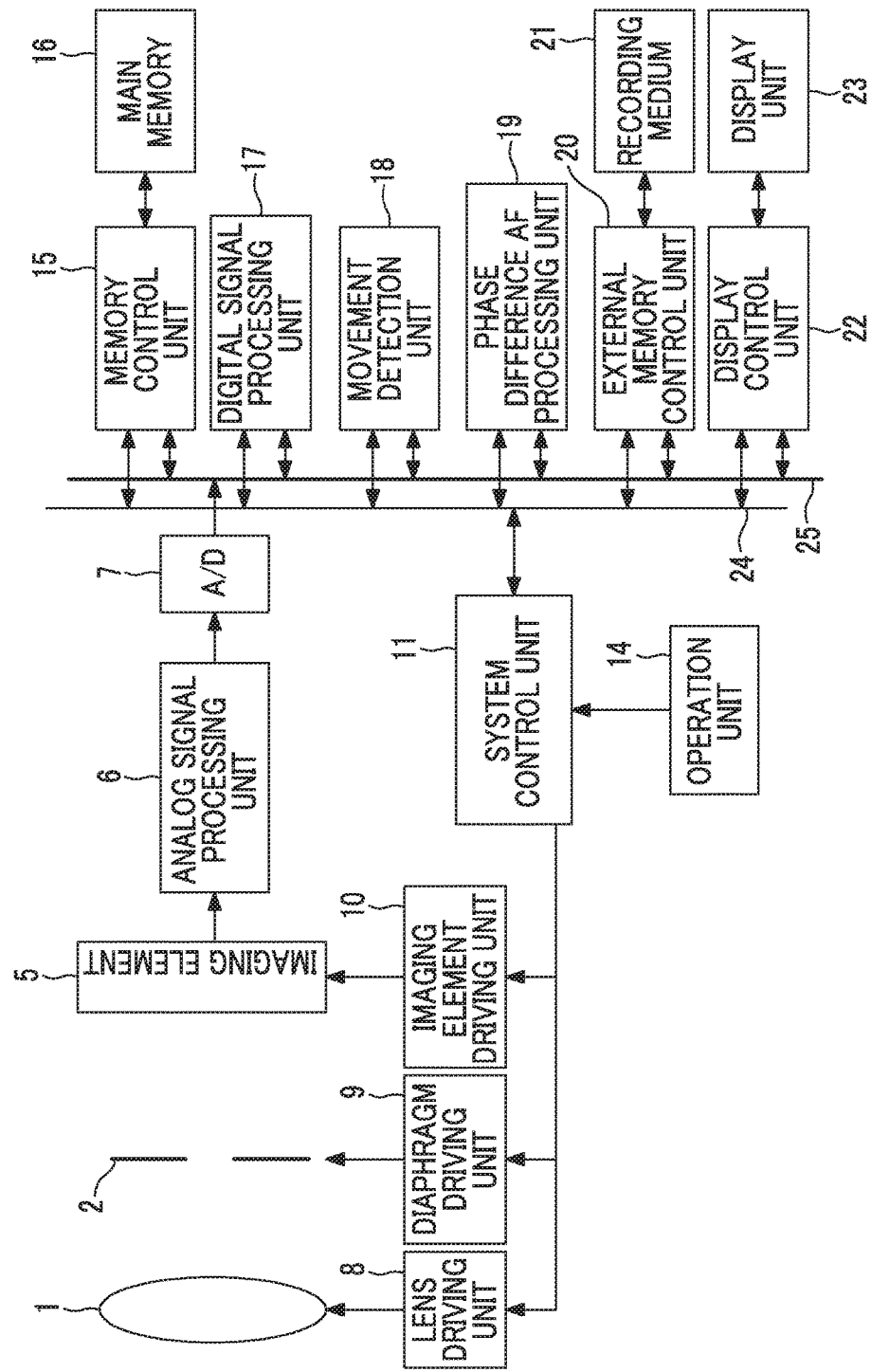
FIG. 1 is a diagram illustrating a schematic configuration of a digital camera which is an example of an imaging device for describing an embodiment of the invention.

FIG. 1 is a diagram illustrating a schematic configuration of a digital camera which is an example of an imaging device for describing an embodiment of the invention.

The digital camera shown in FIG. 1 includes a lens device that includes an imaging lens 1 that includes a focus lens for focus adjustment, a zoom lens, or the like and a diaphragm 2. The lens device forms an imaging optical system.

The lens device shown in FIG. 1 is fixed to a camera main body, but may be exchanged with another lens device. It is sufficient if the imaging lens 1 includes at least the focus lens. The focus lens may be a single focus lens that performs focus adjustment by moving the entirety of the lens system.

The digital camera includes an imaging element 5 of a CCD type, a CMOS type, or the like that images a subject through the imaging optical system, an analog signal processing unit 6 that is connected to an output end of the imaging element 5 and performs analog signal processing such as a correlated double sampling process, and an A/D conversion circuit 7 that converts an analog signal output from the analog signal processing unit 6 into a digital signal.

The analog signal processing unit 6 and the A/D conversion circuit 7 are controlled by a system control unit 11. The analog signal processing unit 6 and the A/D conversion circuit 7 may be built in the imaging element 5.

The system control unit 11 that generally controls the entirety of an electric control system of the digital camera performs a focusing control for controlling a lens driving unit 8 and driving the focus lens included in the imaging lens 1 to be focused on a main subject, or adjusts the position of the zoom lens included in the imaging lens 1. Further, the system control unit 11 controls the degree of opening of the diaphragm 2 through a diaphragm driving unit 9 to adjust a light exposure value.

Further, the system control unit 11 drives the imaging element 5 through an imaging element driving unit 10, and outputs a subject image captured through the imaging lens 1 to the imaging element 5 as a captured image signal. An instruction signal from a user is input to the system control unit 11 through an operation unit 14.

Further, the electric control system of the digital camera includes a main memory 16, a memory control unit 15 connected to the main memory 16, a digital signal processing unit 17, a movement detection unit 18, a phase difference AF processing unit 19, an external memory control unit 20 to which a detachable recording medium 21 is connected, and a display control unit 22 to which a display unit 23 mounted on a rear surface or the like of the camera is connected. The digital signal processing unit 17 generates captured image data by performing an interpolation operation, a gamma correction operation, a RGB/YC conversion process, and the like with respect to a captured image signal output from the A/D conversion circuit 7. The phase difference AF processing unit 19 calculates a defocus amount according to a phase difference AF method.

The memory control unit 15, the digital signal processing unit 17, the movement detection unit 18, the phase difference AF processing unit 19, the external memory control unit 20, and the display control unit 22 are connected to each other through a control bus 24 and a data bus 25, and are controlled by instructions from the system control unit 11. The phase difference AF processing unit 19, the system control unit 11, and the lens driving unit 8 form a focusing control unit.

Figure 2:
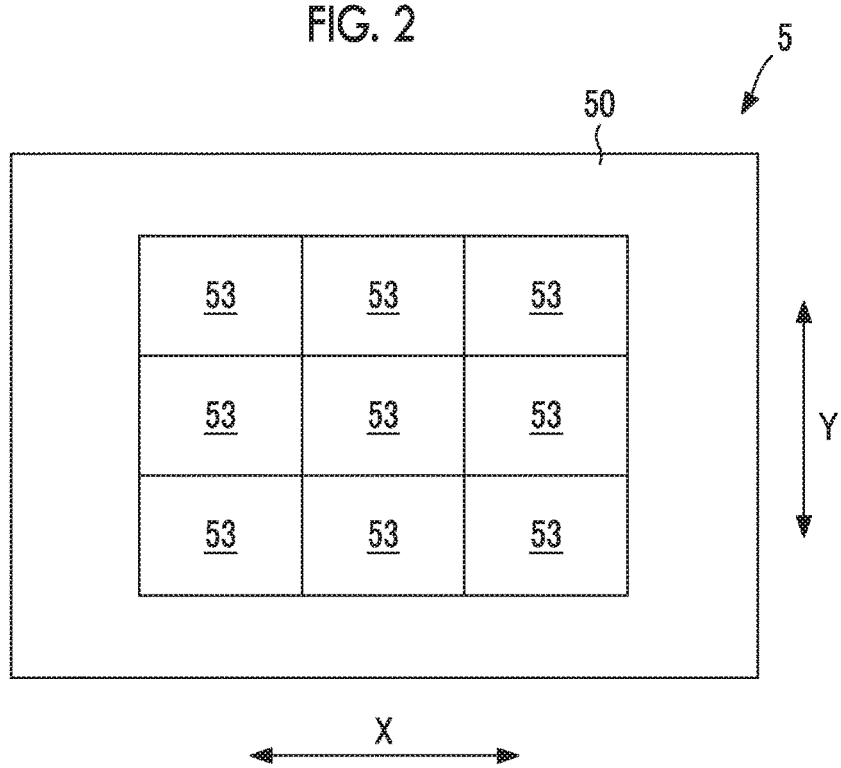
FIG. 2 is a schematic plan view illustrating an overall configuration of an imaging element 5 mounted on the digital camera shown in FIG. 1.

FIG. 2 is a schematic plan view illustrating an overall configuration of the imaging element 5 mounted on the digital camera shown in FIG. 1.

The imaging element 5 includes an imaging surface 50 on which multiple pixels which are arranged in a two-dimensional pattern in a row direction X and in a column direction Y orthogonal to the row direction X. In the example of FIG. 2, nine AF areas 53 which are target areas for focusing are provided on the imaging surface 50.

The AF area 53 is an area that includes an imaging pixel and a phase difference detection pixel as pixels.

In a portion where the AF areas 53 are excluded on the imaging surface 50, only imaging pixels are disposed. The AF areas 53 may be provided on the imaging surface 50 without a gap.

Figure 3:
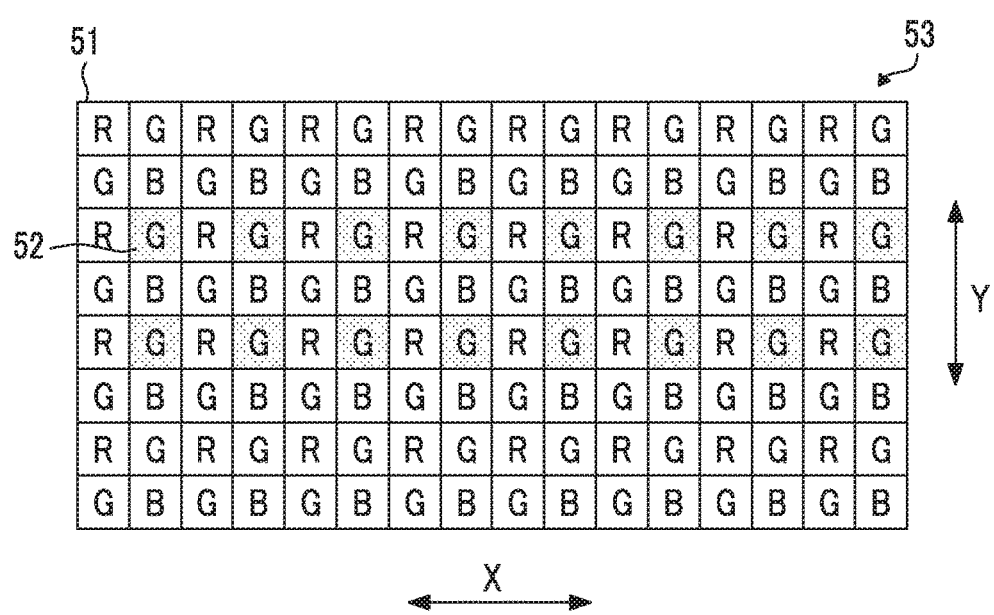
FIG. 3 is a partially enlarged view of a single AF area 53 shown in FIG. 2.

FIG. 3 is a partially enlarged view of a single AF area 53 shown in FIG. 2.

Pixels 51 are arranged in the AF area 53 in a two-dimensional pattern. Each pixel 51 includes a photoelectric conversion unit such as a photo diode, and a color filter formed above the photoelectric conversion unit.

In FIG. 3, letter "R" is given to a pixel 51 (R pixel 51) including a color filter (R filter) that transmits red light, letter "G" is given to a pixel 51 (G pixel 51) including a color filter (G filter) that transmits green light, and letter "B" is given to a pixel 51 (B pixel 51) including a color filter (B filter) that transmits blue light. The color filters are arranged in the form of a Bayer array over the entirety of the imaging surface 50.

In the AF area 53, a part of the G pixels 51 (shaded pixels 51 in FIG. 3) are used as the phase difference detection pixels 52. In the example of FIG. 3, each G pixel 51 in an arbitrary pixel row among pixel rows including the R pixels 51 and the G pixels 51, and the G pixel 51 closest to each G pixel 51 in the column direction Y are used as the phase difference detection pixels 52. Here, as shown in FIG. 3, one direction in the two-dimensional array, which is the same direction as a phase difference separation direction, is defined as the X direction or the row direction, and the other direction is defined as the Y direction or the column direction.

Figure 4:
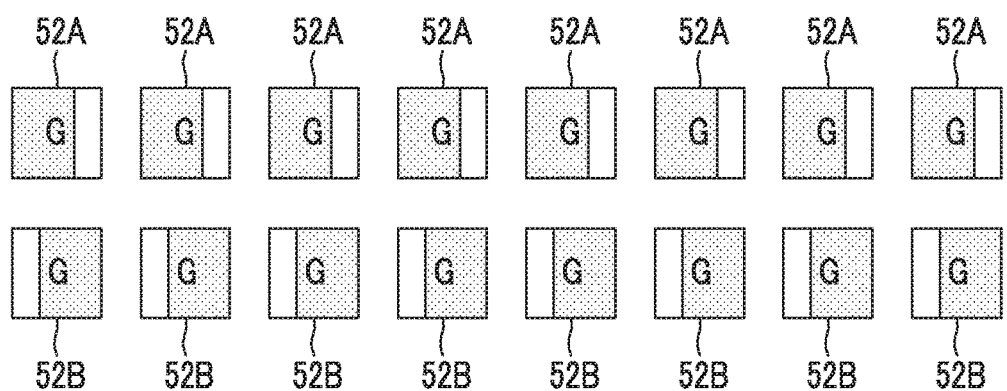
FIG. 4 is a diagram illustrating only a phase difference detection pixel 52 shown in FIG. 3.

FIG. 4 is a diagram illustrating only the phase difference detection pixels 52 shown in FIG. 3.

As shown in FIG. 4, the phase difference detection pixels 52 include two types of pixels which are phase difference detection pixels 52A and phase difference detection pixels 52B.

The phase difference detection pixel 52A is a first signal detection unit that receives one beam among a pair of beams that passes through different portions in a pupil region of the imaging lens 1 and detects a signal depending on the intensity of received light.

The phase difference detection pixel 52B is a second signal detection unit that receives the other beam among the pair of beams and detects a signal depending on the intensity of received light.

In the AF area 53, plural pixels 51 other than the phase difference detection pixels 52A and 52B are imaging pixels, and each imaging pixel receives the pair of beams that passes through the imaging lens 1, and detects a signal depending on the intensity of received light.

A light shielding film is provided above the photoelectric conversion unit of each pixel 51, and an opening for defining a light receiving area of the photoelectric conversion unit is formed in the light shielding film.

The center of the opening of the imaging pixel 51 matches the center of the photoelectric conversion unit of the imaging pixel 51. On the other hand, the center of the opening (white portion in FIG. 4) of the phase difference detection pixel 52A is eccentric rightward with respect to the center of the photoelectric conversion unit of the phase difference detection pixel 52A.

Further, the center of the opening (white portion in FIG. 4) of the phase difference detection pixel 52B is eccentric leftward with respect to the center of the photoelectric conversion unit of the phase difference detection pixel 52B. Here, the right direction represents one direction along the X direction shown in FIG. 3, and the left direction represents the other direction along the X direction.

Figure 5:
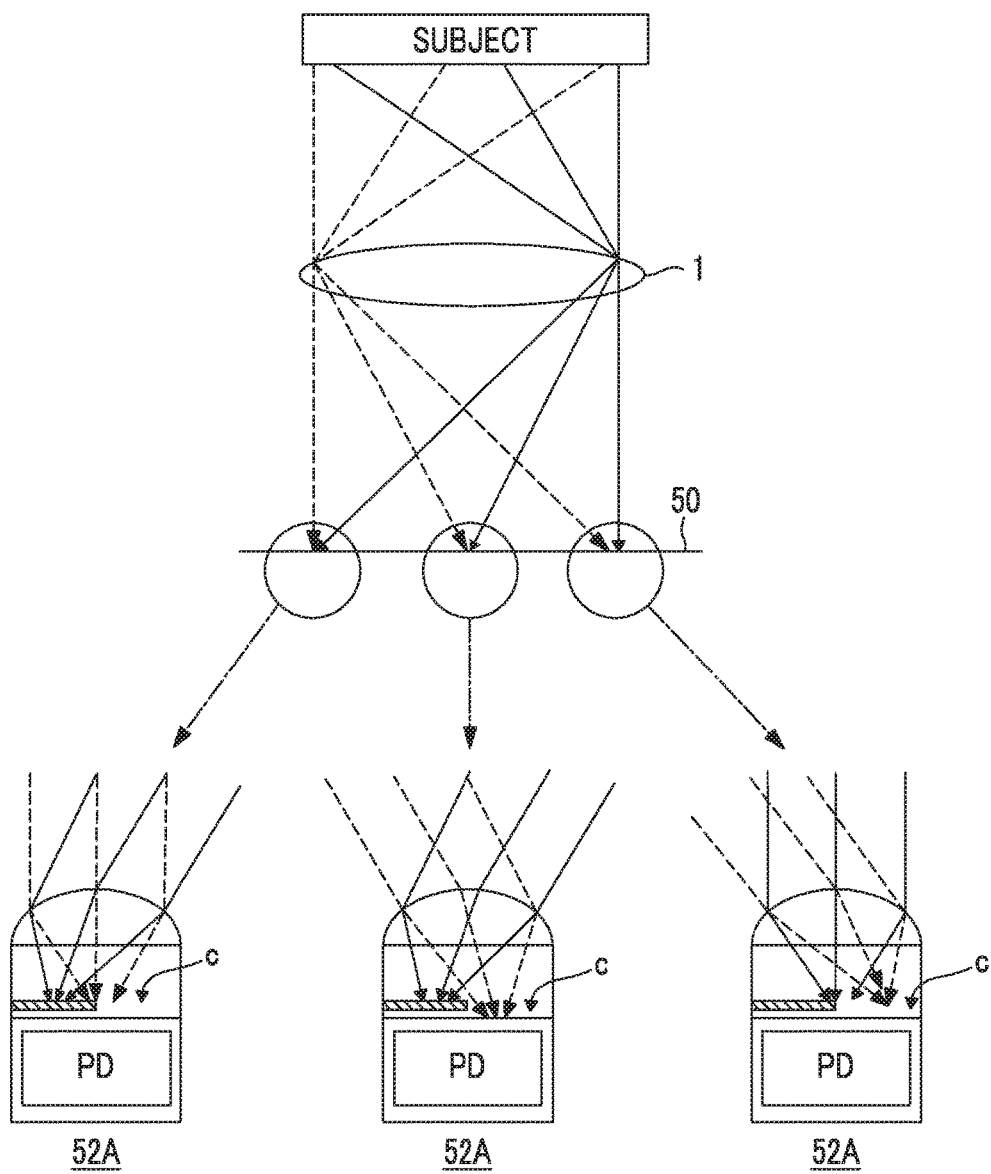
FIG. 5 is a diagram illustrating a sectional configuration of a phase difference detection pixel 52A.

FIG. 5 is a diagram illustrating a sectional configuration of the phase difference detection pixel 52A. As shown in FIG. 5, an opening C of the phase difference detection pixel 52A is eccentric rightward with respect to the photoelectric conversion unit (PD). As shown in FIG. 5, by covering one side of the photoelectric conversion unit by the light shielding film, it is possible to selectively shield light incident in a direction opposite to a side where the photoelectric conversion unit (PD) is covered by the light shielding film.

With such a configuration, it is possible to detect, using a pixel group that includes the phase difference detection pixels 52A which are positioned in an arbitrary row and a pixel group that includes the phase difference detection pixels 52B which are disposed at the same distance in the same direction with respect to each of the phase difference detection pixels 52A of the former pixel group, a phase difference in the row direction X in images respectively captured by the two pixel groups.

The imaging element 5 may have any configuration in which plural pairs of a first signal detection unit group that receives one beam among a pair of beams that passes through different portions in a pupil region of the imaging lens 1 and detects a signal depending on the intensity of received light and a second signal detection unit that receives the other beam among the pair of beams and detects a signal depending on the intensity of received light are provided, and thus, is not limited to the configurations shown in FIGS. 2 to 5.

For example, a configuration in which the entire pixels included in the imaging element 5 are used as the imaging pixels 51, and each imaging pixel 51 is divided into two pieces, in which one divided area is used as the phase difference detection pixel 52A and the other divided area is used as the phase difference detection pixel 52B may be used.

Figure 6:
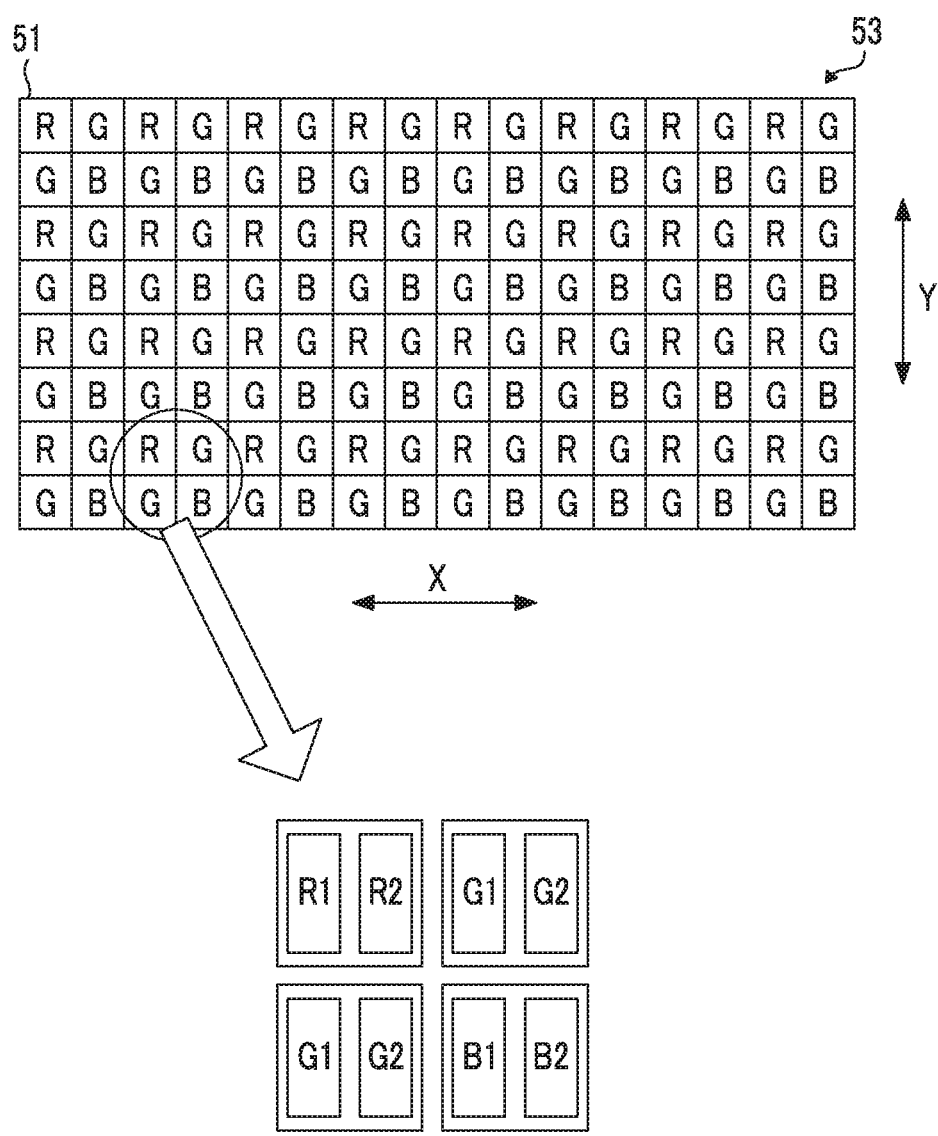
FIG. 6 is a diagram illustrating a configuration in which all pixels included in the imaging element 5 are used as imaging pixels 51 and each imaging pixel 51 is divided into two pieces.

FIG. 6 is a diagram illustrating a configuration in which all pixels included in the imaging element 5 are used as the imaging pixels 51, and each imaging pixel 51 is divided into two pieces.

In the configuration shown in FIG. 6, the imaging pixel 51 with R in the imaging element 5 is divided into two pieces, in which the divided two pieces are a phase difference detection pixel R1 and a phase difference detection pixel R2, respectively.

In addition, the imaging pixel 51 with G in the imaging element 5 is divided into two pieces, in which the divided two pieces are a phase difference detection pixel G1 and a phase difference detection pixel G2, respectively.

Furthermore, the imaging pixel 51 with B in the imaging element 5 is divided into two pieces, in which the divided two pieces are a phase difference detection pixel B1 and a phase difference detection pixel B2, respectively.

In such a configuration, the phase difference detection pixels R1, G1, and B1 serve as the first signal detection units, respectively, and the phase difference detection pixels R2, G2, and B2 serve as the second signal detection units, respectively. It is possible to independently read signals from the first signal detection units and the second signal detection units. Further, if the signals of the first signal detection units and the second signal detection units are added up, normal imaging signals without a phase difference are obtained. That is, in the configuration shown in FIG. 6, the entire pixels may be used as both of the phase difference detection pixels and the imaging pixels.

The phase difference AF processing unit 19 shown in FIG. 1 calculates a phase difference which is a relative position deviation amount of two images formed by the pair of beams using detection signal groups read from the phase difference detection pixels 52A and the phase difference detection pixels 52B disposed in one AF area 53 selected from nine AF areas 53 through a user's operation or the like.

Further, the phase difference AF processing unit 19 calculates a defocus amount which is the amount of movement of a focus lens necessary for matching an image forming surface of a main subject in the imaging lens 1 and an imaging surface of the imaging element 5, based on the phase difference.

As the AF area 53, a single area may be selected, or plural areas which are continuously arranged may be selected.

The movement detection unit 18 shown in FIG. 1 detects whether a movement is present in a subject image captured by the imaging element 5. The presence of the movement in the subject image refers to a case where there is a change which is equal to or greater than a predetermined amount between two subject images which are adjacent to each other in a time series manner.

Figure 7:
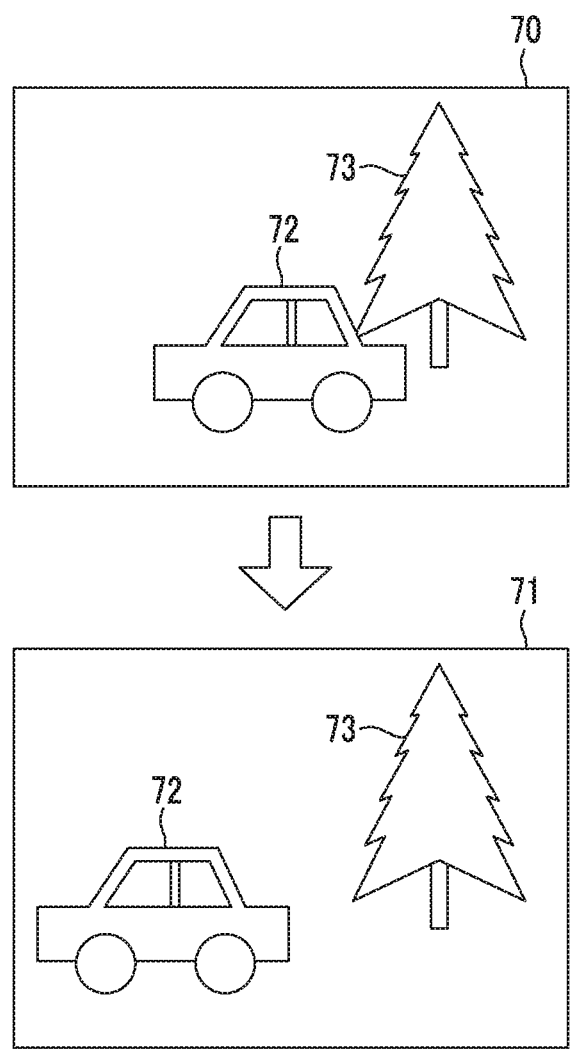
FIG. 7 is a diagram illustrating a movement of a subject image.
Figure 8:
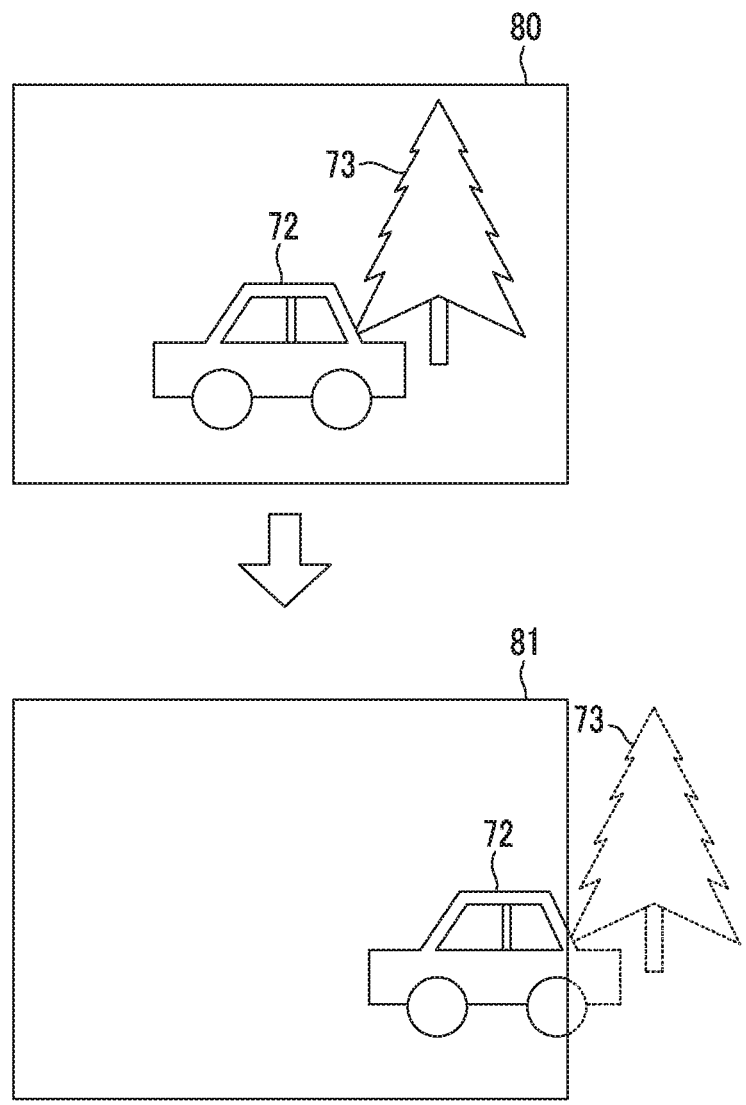
FIG. 8 is a diagram illustrating a movement of the subject image.
Figure 9:
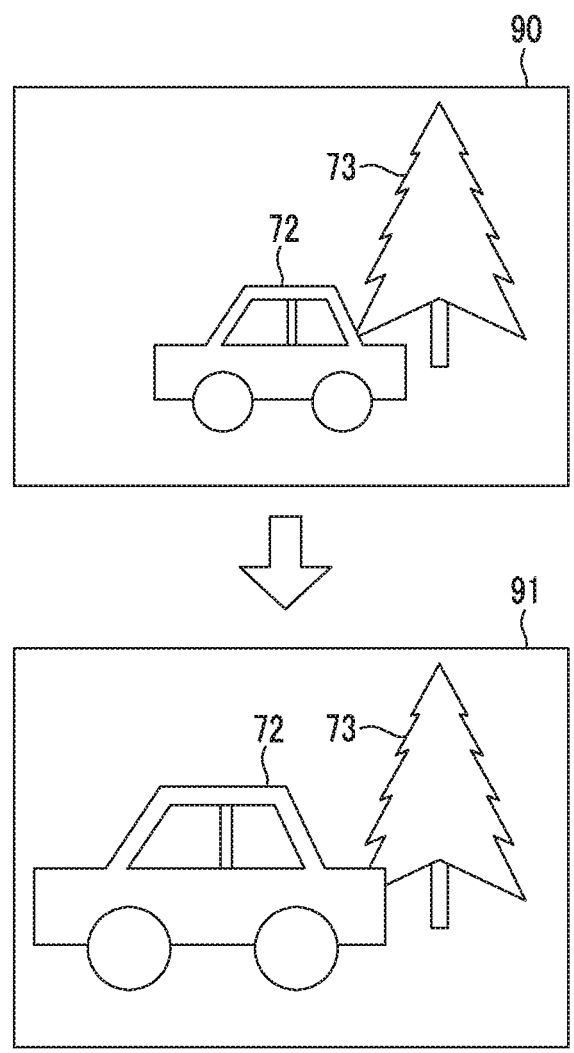
FIG. 9 is diagram illustrating a movement of the subject image.

FIGS. 7 to 9 are diagrams illustrating movements of subject images.

FIG. 7 shows two subject images 70 and 71 which are consecutively captured. The subject image 70 is captured earlier than the subject image 71. The subject image 70 includes a vehicle 72 and a tree 73. In the subject image 71, the position of the tree 73 is not changed, but the vehicle 72 moves in the left direction, with respect to the subject image 70.

In the example of FIG. 7, a movement in a direction (hereinafter, an x-y direction) parallel to the imaging surface 50 of the imaging element 5 occurs in the captured subject, and thus, a movement occurs between the subject image 70 and the subject image 71.

FIG. 8 shows two subject images 80 and 81 which are consecutively captured. The subject image 80 is captured earlier than the subject image 81. The subject image 80 includes the vehicle 72 and the tree 73. In the subject image 81, positions of the vehicle 72 and the tree 73 evenly move rightward with respect to the subject image 80.

In the example of FIG. 8, while no movement is present in the captured image, a digital camera moves leftward between capturing of the subject image 80 and capturing of the subject image 81, and thus, a movement occurs between the subject image 80 and the subject image 81.

FIG. 9 shows two subject images 90 and 91 which are consecutively captured. The subject image 90 is captured earlier than the subject image 91. The subject image 90 includes the vehicle 72 and the tree 73. In the subject image 91, the position of the tree 73 is not changed, but the vehicle 72 moves leftward and moves close to the digital camera, with respect to the subject image 90.

In the example of FIG. 9, there are a movement in a direction (hereinafter, referred to as a z direction) vertical to the imaging surface 50 of the imaging element 5 and a movement in the x-y direction, and thus, a movement occurs between the subject image 90 and the subject image 91.

In this way, the movements of the subject image captured by the imaging element 5 includes a movement due to the movement of the captured subject in the x-y direction, a movement due to the movement of the captured image moves in the z direction, and a movement due to panning of the digital camera.

The movement detection unit 18 compares pieces of captured image data corresponding to two frames consecutively captured by the imaging element 5, and performs block matching between two pieces of captured image data to detect the presence or absence of the movement of the subject image.

Further, the movement detection unit 18 detects correspondence points between the two pieces of captured image data, and detects the presence or absence of the movement of the subject image from a change between positions of the correspondence points. Alternatively, the movement detection unit 18 detects the presence or absence of the movement of the subject image from a fluctuation between divided light measurement values.

The movement detection unit 18 determines that the movement is present in a case where the size of the movement of the subject image exceeds a threshold value, and determines that the movement is not present in a case where the size of the movement of the subject image is equal to or smaller than the threshold value. The threshold value is set to a value capable of excluding a minute change between two images due to noise or the like.

The system control unit 11 causes the phase difference AF processing unit 19 to calculate a defocus amount according to an auto-focus instruction. Further, in a case where the defocus amount exceeds a threshold value XL, the system control unit 11 drives the focus lens up to a focusing position according to the defocus amount, and then, causes the phase difference AF processing unit 19 to calculate the defocus amount again. Subsequently, the system control unit 11 drives the focus lens again according to the defocus amount which is calculated again by the phase difference AF processing unit 19 to complete auto-focusing, and notifies that the auto-focusing is completed. That is, the system control unit 11 continuously performs the phase difference AF according to the auto-focus instruction two times.

In a case where the defocus amount calculated according to the auto-focus instruction is equal to or smaller than the threshold value XL, the system control unit 11 drives the focus lens according to the defocus amount to complete auto-focusing, and notifies that the auto-focusing is completed. That is, the system control unit 11 performs the phase difference AF according to the auto-focus instruction only once.

The auto-focus instruction is input to the system control unit 11 according to a half-push operation of a shutter button provided in the operation unit 14, for example. Further, the auto-focus completion notification may be performed by displaying information on the display unit 23 or by outputting sound, for example.

The system control unit 11 controls the threshold value XL for determining selection between performing the phase difference AF according to the auto-focus instruction two times and performing the phase difference AF according to the auto-focus instruction once, according to whether the movement is present in the subject image.

When the movement is present in the subject image, if the phase difference AF is performed according to the auto-focus instruction two times, when the second phase difference AF is completed, a probability that the subject is greatly changed after the auto-focus instruction is performed becomes high. For this reason, in such a case, the phase-difference AF should be limited to one time, and the system control unit 11 controls the threshold value XL.

Specifically, in a case where it is detected by the movement detection unit 18 that the movement is present in the subject image, the system control unit 11 sets the threshold value XL to be larger than that in a case where the movement is not present in the subject image.

Data on settable threshold value XL may be stored in an internal memory of the system control unit 11 in advance, or alternatively, one reference threshold value may be stored and then another threshold value may be generated by processing the threshold value.

Next, an operation of the digital camera configured as described above will be described.

Figure 10:
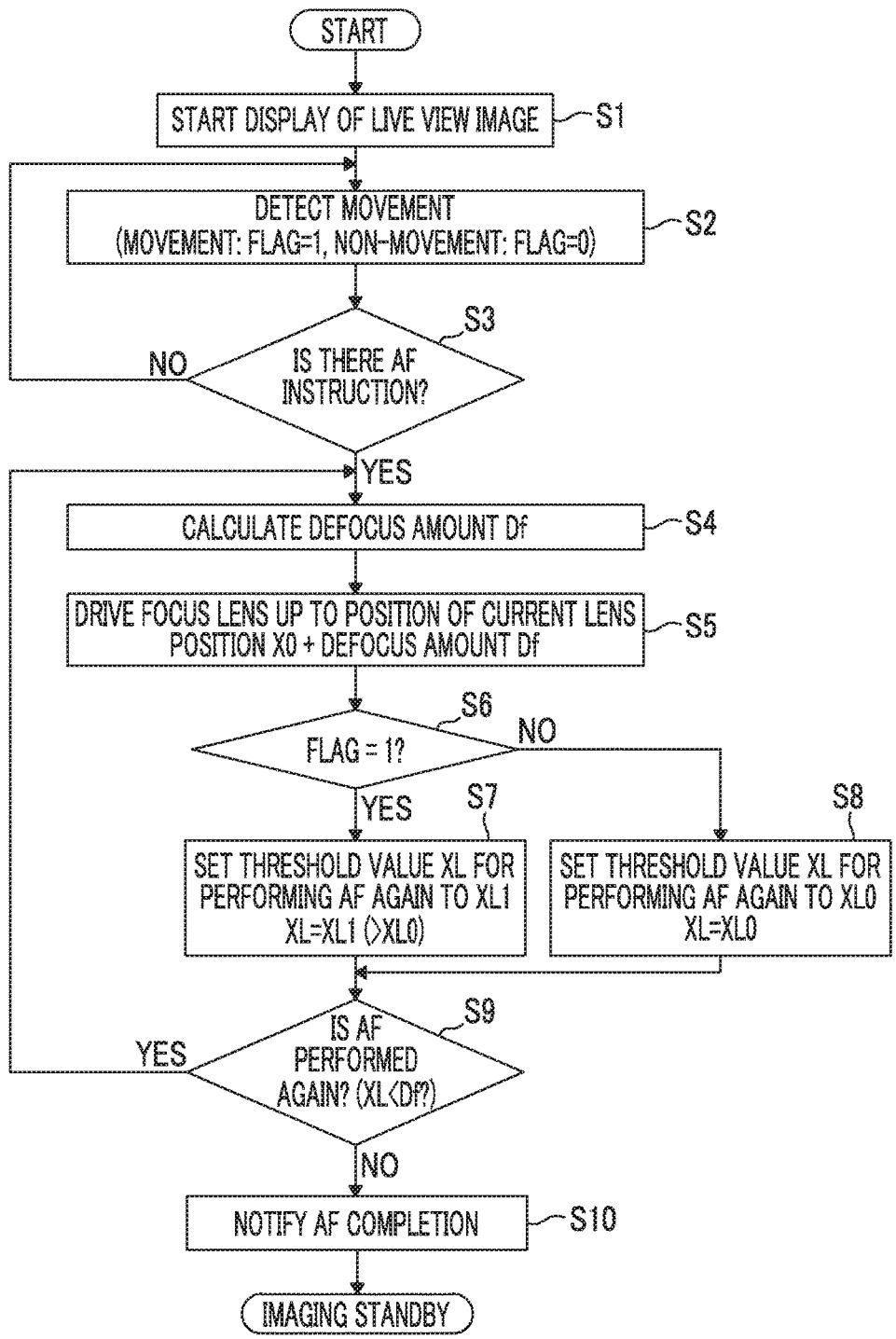
FIG. 10 is a flowchart illustrating an operation of the digital camera shown in FIG. 1.

FIG. 10 is a flowchart illustrating the operation of the digital camera shown in FIG. 1.

If the digital camera is set to an imaging mode, the system control unit 11 starts display of a live view image (step S1). Specifically, the system control unit 11 repeats a control for imaging a subject using the imaging element 5 and displaying an image based on captured image data obtained through the imaging on the display unit 23.

The display of the live view image is started and imaging is performed two or more times, the movement detection unit 18 compares two pieces of captured image data which are temporally consecutive to detect whether a movement is present in a subject image captured by the imaging element 5 (step S2).

In a case where it is detected by the movement detection unit 18 that the movement is present in the subject image, the system control unit 11 sets a flag of the internal memory to "1". In a case where it is detected by the movement detection unit 18 that the movement is not present in the subject image, the system control unit 11 sets a flag of the internal memory to "0".

After step S2, if there is no auto-focus instruction (step S3: NO), the process of step S2 is performed again, and if there is an auto-focus instruction (step S3: YES), a process of step S4 is performed.

In step S4, the system control unit 11 instructs the phase difference AF processing unit 19 to calculate a defocus amount, and accordingly, the phase difference AF processing unit 19 calculates the defocus amount.

Specifically, the phase difference AF processing unit 19 acquires a signal group of the phase difference detection pixels 52A and a signal group of the phase difference detection pixels 52B from captured image signals obtained by the imaging element 5 at a time point when there is an auto-focus instruction, and performs a correlation operation with respect to the two detection signal groups to calculate a defocus amount Df from the correlation operation result.

If the defocus amount Df is calculated, the system control unit 11 drives the focus lens according to the defocus amount Df, and moves the focus lens to a position deviated from a current position of the focus lens by the defocus amount Df (step S5).

Then, the system control unit 11 checks the flag of the internal memory. If the flag is "1", the system control unit 11 performs a process of step S7, and if the flag is "0", the system control unit 11 performs a process of step S8.

In step S8, the system control unit 11 sets the threshold value XL to XL0. In step S7, the system control unit 11 sets the threshold value XL to XL1 which is larger than XL0.

After steps S7 and S8, the system control unit 11 compares the defocus amount Df calculated in step S4 with the threshold values XL set in steps S7 and S8 (step S9).

If the defocus amount Df exceeds the threshold value XL, the system control unit 11 calculates the defocus amount Df in step S4. If the defocus amount Df is equal to or smaller than the threshold value XL, the system control unit 11 completes auto-focusing, and notifies that the auto-focusing is completed (step S10).

As described above, according to the digital camera shown in FIG. 1, in a case where the movement is present in the subject image captured by the imaging element 5, even though the defocus amount Df is large, a probability that phase difference AF is performed according to an auto-focus instruction two times becomes low.

That is, when the movement is present in the subject image, even though the defocus amount Df is large, in many cases, the phase difference AF is performed only once according to the auto-focus instruction, so that the digital camera enters an imaging standby state. Thus, it is possible to cut a shutter in an early stage after the auto-focus instruction is given, and to reduce a probability of missing a shooting opportunity.

Furthermore, according to the digital camera shown in FIG. 1, in a case where the movement is not present in the subject image, when the defocus amount Df is large, a probability that phase difference AF is performed according to the auto-focus instruction two times becomes high. That is, when the movement is not present in the subject image, if the defocus amount Df is large, in many cases, the phase difference AF is performed according to the auto-focus instruction two times, so that the digital camera enters the imaging standby state.

Thus, it is possible to enhance the accuracy of auto-focus even in a case where the defocus amount is large, to thereby achieve high-quality imaging. In a case where the movement is not present in the subject image, since there is a high probability that the subject is not changed even though the phase-difference AF is performed two times, there is nothing to worry about missing a shutter chance.

Hereinafter, a modification example of the digital camera shown in FIG. 1 will be described.

(First Modification Example)

In a case where it is detected that a movement is present in a subject image, the movement detection unit 18 calculates the size of the movement again, and transmits the result to the system control unit 11. The size of the movement may be obtained by calculating a motion factor or the like.

In a case where the movement of the subject image is detected by the movement detection unit 18, the system control unit 11 acquires information about the size of the movement from the movement detection unit 18, and sets the threshold value XL to become a larger value as the size of the movement becomes larger.

Figure 11:
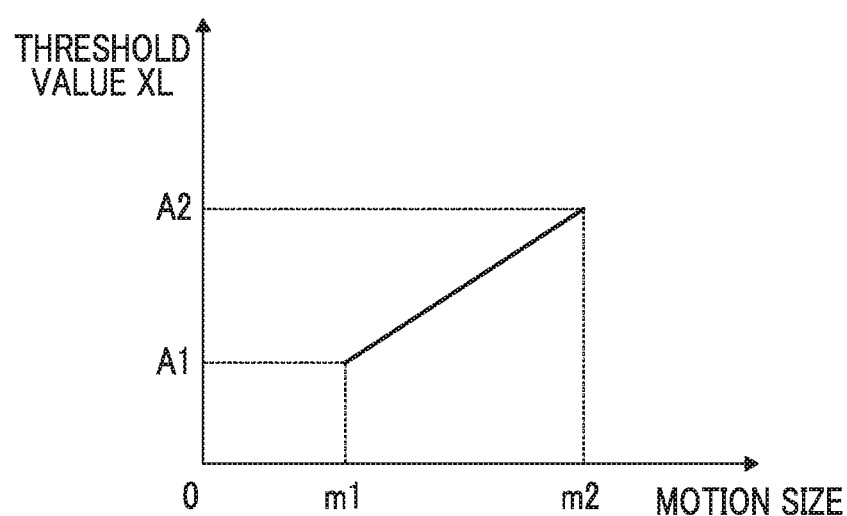
FIG. 11 is a diagram illustrating an example of a relationship between a motion size which is the size of movement of a subject image and a threshold value XL set by a system control unit 11.

FIG. 11 is a diagram illustrating an example of a relationship between a motion size which is the size of a movement of a subject image and a threshold value XL set by the system control unit 11. The system control unit 11 sets the threshold value XL in proportion to the motion size, as shown in FIG. 11. "A1" in FIG. 11 is a value larger than XL0.

In this way, by changing the threshold value XL according to the size of the movement of the subject image, as the movement of the subject image becomes larger, a probability that the phase difference AF is performed two times according to the auto-focus instruction is reduced. The fact that the movement is large means that there is a probability that a subject is greatly changed during the time when the phase difference AF is performed two times.

Thus, by setting the threshold value XL to become larger as the movement becomes larger, it is possible to cause the digital camera to enter an imaging standby state while the subject is not greatly changed, and to image a desired subject.

In FIG. 11, the threshold value XL is continuously changed according to the size of the movement, but the threshold value XL may be changed in stages according to the size of the movement.

(Second Modification Example)

In a case where it is detected that a movement is present in a subject image, the movement detection unit 18 specifies an area where the movement is present in the subject image. Then, the movement detection unit 18 calculates the area of the specified area, and transmits the result to the system control unit 11.

In a case where the movement of the subject image is detected by the movement detection unit 18, the system control unit 11 acquires information about the area of the specific area where the movement is present from the movement detection unit 18, and sets the threshold value XL to become a smaller value as the area becomes larger.

Figure 12:
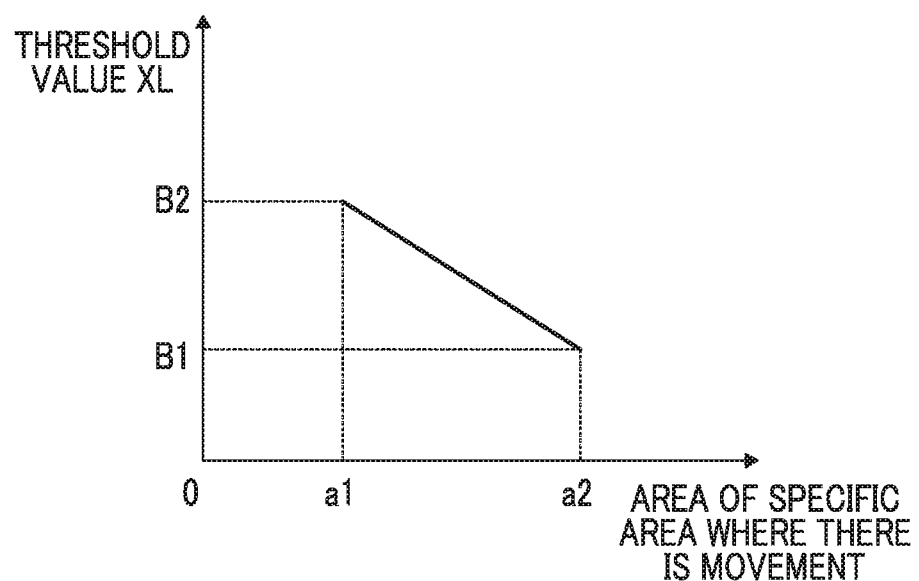
FIG. 12 is a diagram illustrating an example of a relationship between the area of a specific area where a movement is present in a subject image and the threshold value XL set by the system control unit 11.

FIG. 12 is a diagram is a diagram illustrating an example of a relationship between the area of a specific area where a movement is present in a subject image and the threshold value XL set by the system control unit 11. As shown in FIG. 12, the system control unit 11 sets the threshold value XL in proportion to the area of the specific area where the movement is present. "B1" in FIG. 12 represents a value larger than XL0.

In this modification example, in a case where the movement is present in the subject image, as the area of a specific area where the movement is present becomes larger, a probability that the phase difference AF is performed two times according to the auto-focus instruction is increased.

If the size of the area where the movement is present is large even through the movement is present in the subject image, this means that there is a high probability that most of the subject image is changed and the digital camera is in a panned state. Furthermore, in a case where the digital camera is in the panned state, since there is a probability that a defocus amount is changed after an auto-focus instruction is given, it is preferable that the phase difference AF is restarted.

Thus, as the area of the specific area where the movement is present becomes larger and the probability that the digital camera is in the panned state becomes higher, by setting the threshold value XL to become smaller to easily perform the phase difference AF two times, it is possible to differentiate a state where only a specific portion in a subject moves from the panned state, to thereby enhance imaging quality in the panned state.

In FIG. 12, the threshold value XL is continuously changed according to the area of the specific area where the movement is present, but the threshold value XL may be changed in stages according to the area.

(Third Modification Example)

In this modification example, in a case where a movement is present in a subject image, if an auto-focus instruction is given, the system control unit 11 calculates a defocus amount according to the auto-focus instruction, and sets the threshold value XL to become larger as a time until driving of the auto-focus lens based on the defocus amount is completed becomes longer.

Figure 13:
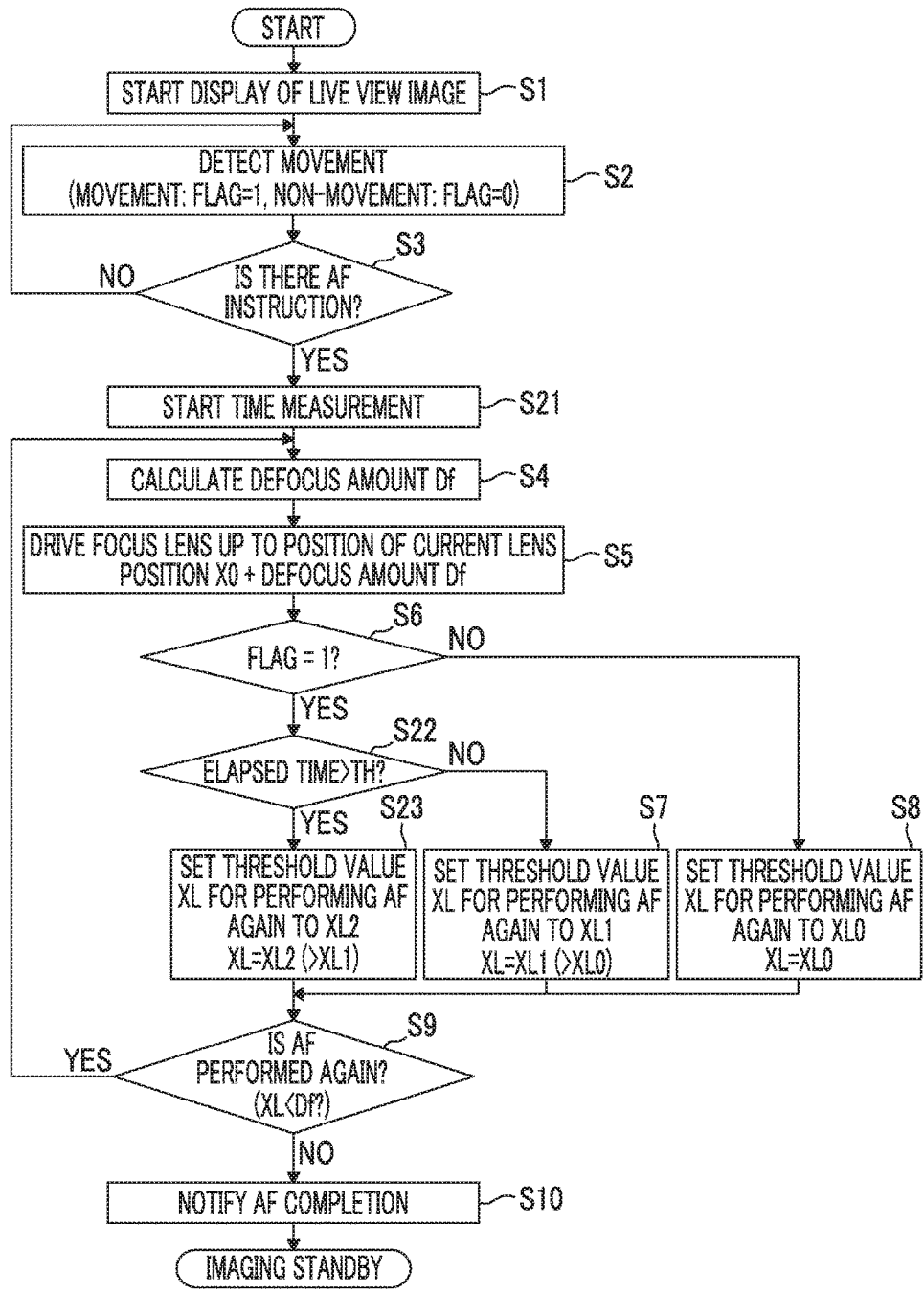
FIG. 13 is a flowchart illustrating a modification example of an operation of the digital camera shown in FIG. 1.

FIG. 13 is a flowchart illustrating a modification example of the operation of the digital camera shown in FIG. 1. In FIG. 13, the same reference numerals are given to the same processes as in FIG. 10, and description thereof will not be repeated.

In a case where there is an auto-focus instruction in step S3, the system control unit 11 starts measurement of a time using an internal timer (step S21).

Then, the processes of step S4 and step S5 are performed. If driving of the focus lens is completed in step S5, the system control unit 11 terminates the measurement of the time.

Then, if a flag is "1" in step S6, a process of step S22 is performed, and if a flag is "0", the process of step S8 is performed.

In step S22, the system control unit 11 compares the time measured by the internal timer, taken from the time when the auto-focus instruction is given to the time when the driving of the auto-focus lens is completed, with the threshold value TH.

If the time exceeds the threshold value TH, the system control unit 11 sets the threshold value XL to XL2 which is larger than XL1 (step S23), and if the time is equal to or smaller than the threshold value TH, the system control unit 11 performs the process of step S7.

After step S23, step S7, and step S8, the process of step S9 and subsequent processes are performed.

When the determination in step S9 is YES, the phase difference AF is performed again, and then, the process of step S22 is performed, but the elapsed time at this time is set to the time measured when the phase difference AF is performed once.

According to this modification example, as the time from the time when the auto-focus instruction is given to the time when the driving of the focus lens is completed becomes longer, a probability that the phase difference AF is performed again is reduced. If the time becomes long, there is a probability that the subject image is greatly changed when the phase difference AF is completed again.

Thus, by setting the threshold value XL to become larger as the time becomes longer, it is possible to cause the digital camera to enter an imaging standby state while the subject is not greatly changed, to thereby image a desired subject.

In FIG. 13, the threshold value XL is changed in stages according to the measured time, but the threshold value XL may be continuously changed according to the measured time.

(Fourth Modification Example)

In this modification example, the movement detection unit 18 dividedly detects a horizontal movement (examples in FIGS. 7 and 8) which is a movement indicating that there is an x-y directional movement in a subject to be imaged and a vertical movement (example in FIG. 9) which is a movement indicating that there is a z-directional movement in the subject to be imaged.

Further, in a case where the vertical movement is detected, the system control unit 11 performs the phase difference AF, calculates a defocus amount again, compares the defocus amount with the threshold value XL, and then, determines whether the phase difference AF is to be performed once or to be performed two times.

Figure 14:
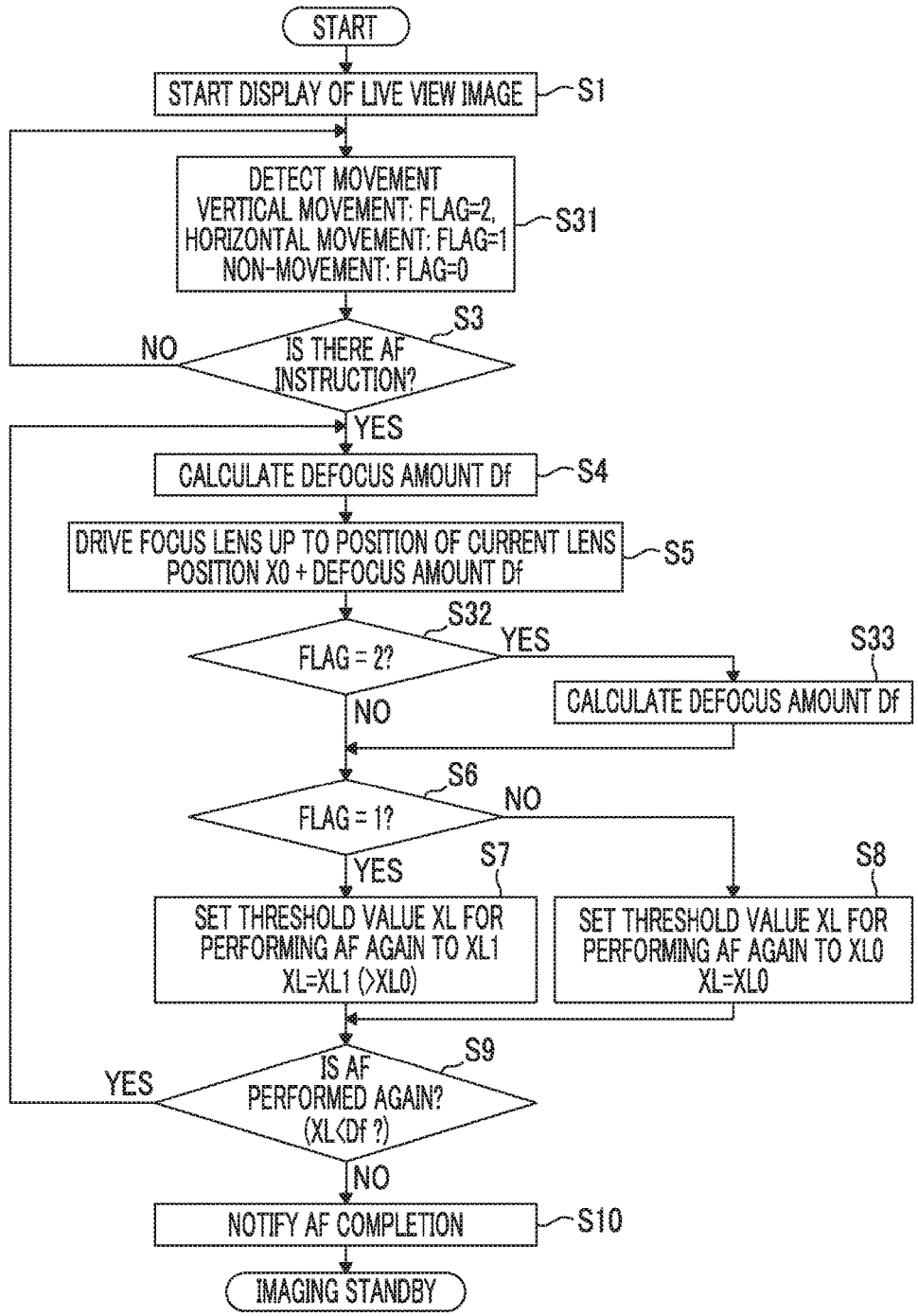
FIG. 14 is a flowchart illustrating modification example of the operation of the digital camera shown in FIG. 1.

FIG. 14 is a flowchart illustrating a modification example of the operation of the digital camera shown in FIG. 1. In FIG. 14, the same reference numerals are given to the same processes as in FIG. 10, and description thereof will not be repeated.

The display of the live view image is started in step S1, the movement detection unit 18 compares two pieces of captured image data which are temporally consecutive to detect whether a horizontal movement occurs in a subject image captured by the imaging element 5 and whether a vertical movement occurs in the subject image (step S31).

The movement detection unit 18 performs block matching between two pieces of captured image data, detects plural representative points (for example, face, positions of eyes, and a location where luminance is greatly changed) of a main subject, and detects the presence or absence of a horizontal movement from a change in a positional relationship between the main subjects in frames.

Further, when a size difference between the main subjects (for example, face or moving object) included in two pieces of captured image data is larger than a threshold value, the movement detection unit 18 determines that there is a vertical movement. When the size difference is equal to or smaller than the threshold value, the movement detection unit 18 determines that there is no vertical movement. This process may be performed using block matching.

The movement detection unit 18 may detect plural representative points (for example, face, positions of eyes, and a location where luminance is greatly changed) of a main subject, and may detect a vertical movement from a change in a positional relationship between the main subjects in frames. For example, a case where only the vehicle 72 in FIG. 9 moves in a transverse direction or in a near direction corresponds to a case where there is a vertical movement in a subject image.

Alternatively, the movement detection unit 18 calculates a phase difference amount by the phase difference AF processing unit 19 from each set of captured image signals obtained through imaging which is consecutively performed two times. Further, the movement detection unit 18 determines that there is a vertical movement when a difference between two calculated phase difference amounts is larger than a threshold value, and determines that there is no vertical movement when the difference is equal to or smaller than the threshold value.

In the imaging element of FIG. 6, since all pixels may be used for phase difference signal detection or for imaging, it is possible to detect a phase difference amount on any imaging surface. Thus, this imaging element is advantageous for a method for detecting a vertical movement from a difference between the phase difference amounts.

In a case where it is detected by the movement detection unit 18 that there is a horizontal movement, the system control unit 11 sets a flag of the internal memory to "1".

In a case where it is detected by the movement detection unit 18 that there is a vertical movement, the system control unit 11 sets a flag of the internal memory to "2".

In a case where it is detected by the movement detection unit 18 that there is neither a horizontal movement nor a vertical movement, the system control unit 11 sets a flag of the internal memory to "0".

Then, if an auto-focus instruction is given and the phase difference AF is performed, the system control unit 11 checks the flag of the internal memory. If the flag is "2", a process of step S33 is performed, and if the flag is "1" or "0", the process of step S6 is performed.

In step S33, the system control unit 11 performs the same process as in step S4, and calculates the defocus amount Df again. After step S33, the procedure proceeds to step S6. Here, when step S33 is performed, the system control unit 11 compares the defocus amount calculated in step S33 with the threshold value XL, in step S9.

According to this modification example, in a case where there is a vertical movement in a subject image, the phase difference AF is performed once, and then, the defocus amount is calculated again. Then, the determination of step S9 is performed based on the size of the defocus amount.

When there is a vertical movement, after an auto-focus instruction is given, there is a probability that a specific object moves near or far in a subject, and there is a probability that a defocus amount is changed. Thus, by performing the determination of step S9 after calculating the defocus amount again, it is possible to enhance the accuracy of determining whether the phase difference AF is to be performed once or to be performed two times, to thereby enhance imaging quality.

In this embodiment, an example in which the digital camera is used as the imaging device is shown, but hereinafter, an embodiment in which a smart phone with a camera will be described as the imaging device.

Figure 15:
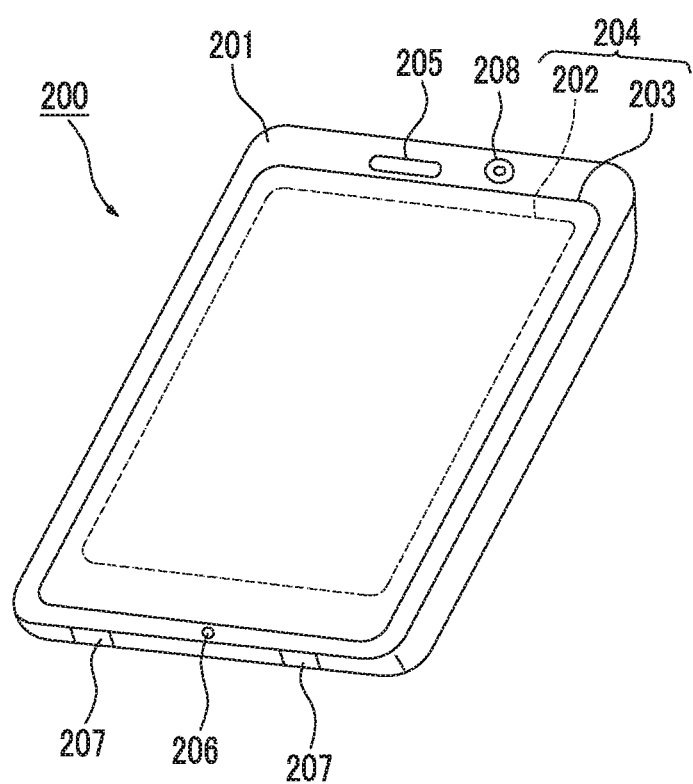
FIG. 15 is a diagram showing an appearance of a smart phone 200 which is an embodiment of the imaging device of the invention.

FIG. 15 is a diagram showing an appearance of a smart phone 200 which is an embodiment of the imaging device of the invention. The smart phone 200 shown in FIG. 15 includes a flat housing 201, and a display input unit 204 that is disposed on one surface of the housing 201 and includes a display panel 202 which is a display unit and an operation panel 203 which is an input unit, in which the display panel 202 and the operation panel 203 are integrally formed. Further, the housing 201 includes a speaker 205, a microphone 206, an operation unit 207, and a camera unit 208. The configuration of the housing 201 is not limited thereto, and for example, a configuration in which the display unit and the input unit are independently provided may be employed, or a configuration in which a folding structure or a slide mechanism is provided may be employed.

Figure 16:
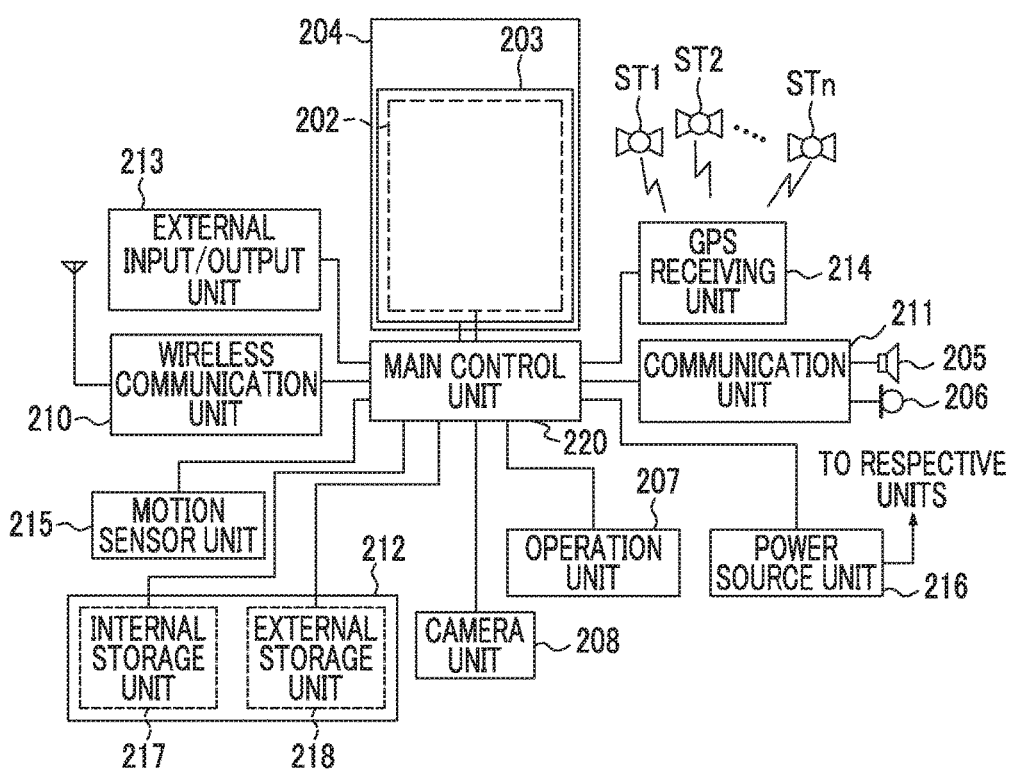
FIG. 16 is a block diagram illustrating an internal configuration of the smart phone 200 shown in FIG. 15.
Figure 17:
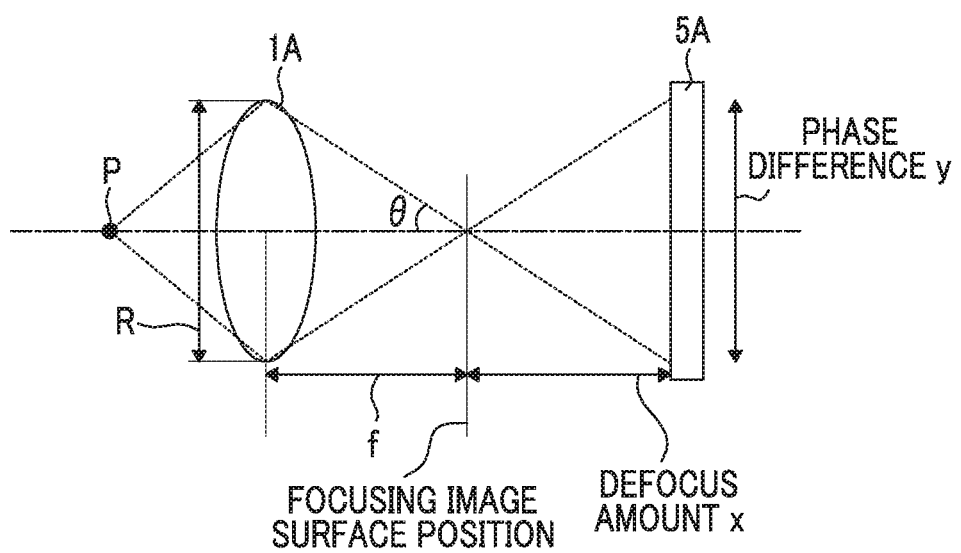
FIG. 17 is a diagram illustrating a method for calculating a defocus amount based on a phase difference AF method.

FIG. 16 is a block diagram illustrating the configuration of the smart phone 200 shown in FIG. 15. As shown in FIG. 16, as main components of the smart phone, a wireless communication unit 210, the display input unit 204, a communication unit 211, the operation unit 207, the camera unit 208, a storage unit 212, an external input/output unit 213, a global positioning system (GPS) receiving unit 214, a motion sensor unit 215, a power source unit 216, and a main control unit 220 are provided. Further, as main functions of the smart phone 200, a wireless communication function for performing mobile wireless communication through a base station device BS (not shown) and a mobile communication network NW (not shown) is provided.

The wireless communication unit 210 performs wireless communication with respect to the base station device BS included in the mobile communication network NW according to an instruction of the main control unit 220. The wireless communication unit 210 performs transmission and reception of a variety of file data such as sound data or image data, e-mail data, or the like, or performs reception of Web data, streaming data, or the like using the wireless communication.

The display input unit 204 is a so-called touch panel that displays an image (a static image and a video image), character information, or the like under the control of the main control unit 220 to visually transmit the result to a user, and detects a user operation with respect to the displayed information. The display input unit 204 includes the display panel 202 and the operation panel 203.

The display panel 202 uses a liquid crystal display (LCD), an organic electro-luminescence display (OLED), or the like as a display device.

The operation panel 203 is a device that is mounted so that an image displayed on a display surface of the display panel 202 can be visually recognized and detects one or plural coordinates operated by a user's finger or a stylus. If the device is operated by the user's finger or the stylus, a detection signal generated due to the operation is output to the main control unit 220. Then, the main control unit 220 detects an operation position (coordinates) on the display panel 202 based on the received detection signal.

As shown in FIG. 15, the display panel 202 and the operation panel 203 of the smart phone 200 shown as an example of one embodiment of the imaging device of the invention are integrated to form the display input unit 204, in which the operation panel 203 is arranged to completely cover the display panel 202.

In a case where such an arrangement is employed, the operation panel 203 may have a function of detecting a user operation in a region out of the display panel 202. In other words, the operation panel 203 may include a detection region with respect to a portion that overlaps the display panel 202 (hereinafter, referred to as a display region), and a detection region with respect to an outer edge portion that does not overlap the display panel 202 (hereinafter, referred to as a non-display region).

The size of the display region and the size of the display panel 202 may completely be the same, but it is not essential that both of the sizes are the same. Further, the operation panel 203 may include two sensitive regions of an outer edge portion and an inner portion other than the outer edge portion. Further, the width of the outer edge portion is appropriately set according to the size or the like of the housing 201. Furthermore, as a position detecting method employed in the operation panel 203, any one of a matrix switch type, a resistive film type, a surface acoustic wave type, an infrared type, an inductive coupling type, an electrostatic capacitance type, and the like may be employed.

The communication unit 211 includes the speaker 205 and the microphone 206, and converts user's voice input through the microphone 206 into voice data capable of being processed by the main control unit 220 and outputs the result to the main control unit 220, or decodes voice data received by the wireless communication unit 210 or the external input/output unit 213 and outputs the result through the speaker 205. Further, as shown in FIG. 15, for example, the speaker 205 may be mounted on the same surface as the surface where the display input unit 204 is provided, and the microphone 206 may be mounted on a side surface of the housing 201.

The operation unit 207 is a hardware key using a key switch or the like, and receives an instruction from a user. For example, as shown in FIG. 15, the operation unit 207 is a push button switch that is mounted on a side surface of the housing 201 of the smart phone 200, is turned on when being pressed by a finger or the like, and is turned off by a restoring force of a spring or the like when the finger is separated.

The storage unit 212 stores a control program or control data of the main control unit 220, application software, address data in which a name, a telephone number, and the like of a communication partner are associated with each other, data on transmitted or received e-mail, Web data downloaded by a Web browser, or data on downloaded content, and temporarily stores streaming data or the like. Further, the storage unit 212 includes an internal storage section 217 provided in the smart phone, and an external storage section 218 provided with a detachable memory slot. Each of the internal storage section 217 and the external storage section 218 that form the storage unit 212 is realized using a storage medium such as a flash memory type, a hard disk type, a multimedia card micro type memory, a card type memory (for example, MicroSD (registered trademark) memory or the like), a random access memory (RAM), a read only memory (ROM), or the like.

The external input/output unit 213 serves as an interface with respect to all types of external devices to be connected to the smart phone 200, and is configured to be directly or indirectly connected to other external devices through communication or the like (for example, universal serial bus (USB), IEEE1394, or the like) or a network (for example, Internet, wireless LAN, Bluetooth (registered trademark), radio frequency identification (RFID), Infrared Data Association (IrDA, registered trademark), Ultra Wideband (UWB, registered trademark), ZigBee (registered trademark), or the like).

As the external device connected to the smart phone 200, for example, a wired or wireless headset, a wired or wireless external charger, a wired or wireless data port, a memory card, a subscriber identity module card (SIM) or a user identity module card (UIM card) connected through a card socket, an external audio/video device connected through an audio/video input/output (I/O) terminal, an external audio/video device connected in a wireless manner, a smart phone connected in a wired or wireless manner, an earphone, or the like is used. The external input/output unit 213 may be configured to transmit data transmitted and received from the external device to respective components in the smart phone 200, or to transmit data in the smart phone 200 to the external device.

The GPS receiving unit 214 receives GPS signals transmitted from GPS satellites ST1 to STn according to an instruction of the main control unit 220, executes a positioning operation process based on the plural received GPS signals, and detects the position of the smart phone 200 including latitude, longitude and altitude. When position information can be acquired from the wireless communication unit 210 or the external input/output unit 213 (for example, wireless LAN), the GPS receiving unit 214 can also detect the position using the position information.

The motion sensor unit 215 includes a triaxial acceleration sensor or the like, for example, and detects a physical movement of the smart phone 200 according to an instruction of the main control unit 220. By detecting the physical movement of the smart phone 200, a direction and an acceleration where the smart phone 200 moves are detected. The detection result is output to the main control unit 220.

The power source unit 216 supplies power to be accumulated in a battery (not shown) to respective units of the smart phone 200 according to an instruction of the main control unit 220.

The main control unit 220 includes a micro processor, and is operated according to a control program or control data stored in the storage unit 212 to generally control the respective units of the smart phone 200. Further, the main control unit 220 has a mobile communication control function for controlling respective units of a communication system and an application processing function in order to perform voice communication or data communication through the wireless communication unit 210.

The application processing function is realized as the main control unit 220 is operated according to application software stored in the storage unit 212. As the application processing function, for example, an infrared communication function for controlling the external input/output unit 213 to perform data communication with an opposing device, an e-mail function for performing transmission and reception of e-mails, a Web browsing function for browsing Web pages, or the like is used.

Further, the main control unit 220 has an image processing function, for example, for displaying an image on the display input unit 204 based on image data (data on a static image or a video image) such as received data or downloaded streaming data. The image processing function refers to a function for decoding the image data by the main control unit 220, performing image processing with respect to the decoded image data, and displaying an image on the display input unit 204.

In addition, the main control unit 220 executes a display control with respect to the display panel 202, and an operation detection control for detecting a user operation through the operation unit 207 or the operation panel 203. By executing the display control, the main control unit 220 displays an icon for starting up application software or a software key such as a scroll bar, or displays a window for creating an e-mail. The scroll bar refers to a soft key for receiving, with respect to an image which cannot be accommodated in a display region of the display panel 202, an instruction for movement of a display portion of the image.

Further, by execution of the operation detection control, the main control unit 220 detects a user operation through the operation unit 207, receives an operation with respect to an icon or an input of a character string with respect to an input section of the window through the operation panel 203, or receives a scroll request of a display image through the scroll bar.

Further, by execution of the operation detection control, the main control unit 220 includes a touch panel control function for determining whether an operation position with respect to the operation panel 203 is a portion (display region) that overlaps the display panel 202 or an outer edge portion (non-display region) that does not overlap the display panel 202, and controlling a sensitive region of the operation panel 203 and a display position of a soft key.

In addition, the main control unit 220 may detect a gesture operation with respect to the operation panel 203, and may execute a predetermined function according to the detected gesture operation. The gesture operation does not refer to a typical simple operation, but refers to an operation of drawing a locus using a finger or the like, an operation of simultaneously designating plural positions, or an operation of drawing a locus with respect to at least one of plural positions by combination of the above operations.

The camera unit 208 includes a configuration other than the external memory control unit 20, the recording medium 21, the display control unit 22, the display unit 23, the operation unit 14 in the digital camera shown in FIG. 1.

The captured image data generated by the camera unit 208 may be recorded in the storage unit 212, or may be output through the input/output unit 213 or the wireless communication unit 210.

In the smart phone 200 shown in FIG. 15, the camera unit 208 is mounted on the same surface as that of the display input unit 204, but the mounting position of the camera unit 208 is not limited thereto, and may be a rear surface of the display input unit 204.

Further, the camera unit 208 may be used for various functions of the smart phone 200. For example, an image acquired by the camera unit 208 may be displayed on the display panel 202, or the image of the camera unit 208 may be used as one of operation inputs through the operation panel 203.

Further, when detecting the position using the GPS receiving unit 214, it is possible to detect the position with reference to the image from the camera unit 208. In addition, it is possible to determine an optical axis direction of the camera unit 208 of the smart phone 200 without using the triaxial acceleration sensor or by using the triaxial acceleration sensor together with reference to the image from the camera unit 208, or a current usage environment. Further, the image from the camera unit 208 may be used in the application software.

Furthermore, position information acquired by the GPS receiving unit 214, voice information (which may be text information obtained by performing voice text conversion by the main control unit or the like) acquired by the microphone 206, posture information acquired by the motion sensor unit 215, or the like may be added to the image data on a static image or a video image, and the result may be stored in the storing unit 212, or may be output through the input/output unit 213 or the wireless communication unit 210.

In the smart phone 200 having the above-described configuration, similarly, by using the imaging element 5 as the imaging element of the camera unit 208, and by performing the processes shown in FIGS. 10 to 14, it is possible to perform high-quality imaging without missing a shooting opportunity.

As described above, this specification discloses the following content.

According to the disclosure, an imaging device includes: an imaging element that includes a first signal detection unit that detects a signal based on one beam among a pair of beams that passes through different portions in a pupil region of an imaging optical system including a focus lens, and a second signal detection unit that detects a signal based on the other beam among the pair of beams, and images a subject through the imaging optical system; a focusing control unit that calculates a defocus amount using a detection signal of the first signal detection unit and a detection signal of the second signal detection unit and drives the focus lens according to the defocus amount; and a movement detection unit that detects whether a movement is present in a subject image captured by the imaging element. The focusing control unit calculates the defocus amount according to an auto-focus execution instruction, and drives, in a case where the defocus amount exceeds a threshold value, the focus lens according to the defocus amount and then performs again the calculation of the defocus amount using the detection signal of the first signal detection unit and the detection signal of the second signal detection unit and the driving of the focus lens according to the defocus amount to complete auto-focusing. Further, in a case where the defocus amount is equal to or smaller than the threshold value, the focusing control unit drives the focus lens according to the defocus amount to complete the auto-focusing. In a case where the movement is present in the subject image, the focusing control unit sets the threshold value to be a larger value, compared with a case where the movement is not present in the subject image.

According to this configuration, even though the defocus amount is the same, in a case where the movement is present in the subject image, compared with a case where the movement is not present in the subject image, a probability that the calculation of the defocus amount and the driving of the focus lens are performed again is reduced, and thus, it is possible to reduce a probability of missing a shooting opportunity. Further, in a case where the movement is not present in the subject image, after the calculation of the defocus amount and the driving of the focus lens, since a probability that the calculation of the defocus amount and the driving of the focus lens are performed again is increased, even in a case where the defocus amount is large, it is possible to enhance the accuracy of auto-focus, to thereby perform high quality imaging. In addition, in a case where the movement is not present in the subject image, since there is a high probability that the subject is not changed even though the driving of the focus lens is performed again, there is nothing to worry about missing a shooting opportunity.

In the above imaging device, the movement detection unit may further detect the size of the movement, and in a case where the movement is present in the subject image, the focusing control unit may set the threshold value to become larger as the size of the movement becomes larger.

According to this configuration, as the movement of the subject image becomes larger, a probability that the calculation of the defocus amount and the driving of the focus lens are performed again is reduced. If the movement is large, this means that there is a high probability that a subject is greatly changed during the time when the calculation of the defocus amount and the driving of the focus lens are performed again. Thus, by setting the threshold value to become larger as the size of the movement becomes larger, it is possible to cause the digital camera to enter a state where imaging can be performed while the subject is not greatly changed.

In the above imaging device, the movement detection unit may specify an area where the movement is present in the subject image, and in a case where the movement is present in the subject image, the focusing control unit may set the threshold value to become smaller as the area of the specific area where the movement is present becomes larger.

According to this configuration, as the size of the area where the movement is present becomes larger, a probability that the calculation of the defocus amount and the driving of the focus lens are performed again is reduced. If the size of the area where the movement is present is large even though the movement is present in the subject image, this means that most of the subject image is changed, and that there is also a probability that the digital camera is in a panned state. Thus, as a probability that the area of the specific area where the movement is present is and the digital camera is in the panned state becomes larger, the threshold value is set to become smaller so that auto-focusing is easily performed again. Thus, it is possible to distinguish the time when a specific portion in the subject moves from the panned state, to thereby enhance imaging quality in the panned state.

In the above imaging device, in a case where the movement is present in the subject image, the focusing control unit may calculate, after the execution instruction is given, the defocus amount according to the execution instruction, and may set the threshold value to become larger as a time until the driving of the focus lens according the defocus amount is completed becomes longer.

According to this configuration, as the time until the driving of the focus lens is completed after the auto-focus execution instruction is given becomes longer, a probability that the calculation of the defocus amount and the driving of the focus lens are performed again is reduced. If the time is long, there is a probability that the subject is greatly changed when the calculation of the defocus amount and the driving of the focus lens are completed. Thus, by setting the threshold value to become larger as the time becomes longer, it is possible to cause the digital camera to enter a state where imaging can be performed while the subject is not greatly changed.

In the above imaging device, the movement detection unit may dividedly detect a vertical movement of the subject image based on a movement in a vertical direction with respect to the imaging surface, of a subject imaged by the imaging element and a horizontal movement of the subject image based on a movement in a horizontal direction with respect to the imaging surface, of the subject imaged by the imaging element. The focusing control unit may drive, in a case where the vertical movement is detected, the focus lens according to the defocus amount calculated according to the execution instruction, may perform again the calculation of the defocus amount using the detection signal of the first signal detection unit and the detection signal of the second signal detection unit, and may compare the defocus amount with the threshold value to determine whether to perform again the calculation of the defocus amount and the driving of the focus lens.

According to this configuration, in a case where there is the vertical movement in the subject image, the calculation of the defocus amount is performed again, and the number of times of the lens driving is determined according to the size of the defocus amount. When there is the vertical movement in the subject image, after the execution instruction, there is a probability that a specific object moves near or far in the subject, and there is a probability that the defocus amount is changed. Thus, by performing the determination after calculating the defocus amount again, it is possible to enhance the accuracy of determination of whether to drive the lens once or two times, to thereby enhance imaging quality.

According to the disclosure, a focusing control method includes: a focusing control step of calculating a defocus amount using a detection signal of the first signal detection unit and a detection signal of the second signal detection unit output from an imaging element that includes a first signal detection unit that detects a signal based on one beam among a pair of beams that passes through different portions in a pupil region of an imaging optical system including a focus lens and a second signal detection unit that detects a signal based on the other beam among the pair of beams, and images a subject through the imaging optical system, and driving the focus lens according to the defocus amount; and a movement detection step of detecting whether a movement is present in a subject image captured by the imaging element. In the focusing control step, the defocus amount is calculated according to an auto-focus execution instruction, and in a case where the defocus amount exceeds a threshold value, the focus lens is driven according to the defocus amount and then the calculation of the defocus amount using the detection signal of the first signal detection unit and the detection signal of the second signal detection unit and the driving of the focus lens are performed again according to the defocus amount to complete auto-focusing. Further, in the focusing control step, in a case where the defocus amount is equal to or smaller than the threshold value, the focus lens is driven according to the defocus amount to complete the auto-focusing. Further, in the focusing control step, in a case where the movement is present in the subject image, the threshold value is set to be a larger value, compared with a case where the movement is not present in the subject image.

INDUSTRIAL APPLICABILITY

The invention is applied to a digital camera or the like to provide high convenience and effectiveness.

EXPLANATION OF REFERENCES

1: imaging lens
5: imaging element
8: lens driving unit
11: system control unit
18: movement detection unit
19: phase difference AF processing unit
51: imaging pixel
52, 52A, 52B: phase difference detection pixel
53: AF area

What is claimed is:
1. An imaging device comprising:
an imaging element that includes a first signal detection pixel that detects a signal based on one beam among a pair of beams that passes through different portions in a pupil region of an imaging optical system including a focus lens, and a second signal detection pixel that detects a signal based on the other beam among the pair of beams, and images a subject through the imaging optical system; and
at least one processor configured to
calculate a defocus amount using a detection signal of the first signal detection pixel and a detection signal of the second signal detection pixel and drive the focus lens according to the defocus amount; and
detect whether a movement is present in a subject image captured by the imaging element,
wherein the processor further detects a size of the movement,
wherein the processor calculates the defocus amount according to an auto-focus execution instruction, drives, in a case where the defocus amount exceeds a threshold value, the focus lens according to the defocus amount, in a case where the movement is present in the subject image, the processor resets the threshold value to become larger as the size of the movement becomes larger, and then perform calculating the defocus amount using the detection signal of the first signal detection pixel and the detection signal of the second signal detection pixel and driving the focus lens according to the defocus amount again to complete auto-focusing based on a comparison of the defocus amount with the enlarged threshold value, and drives, in a case where the defocus amount calculated according to the auto-focus execution instruction is equal to or smaller than the threshold value, the focus lens according to the defocus amount to complete auto-focusing.

2. The imaging device according to claim 1,
wherein the processor specifies an area where the movement is present in the subject image, and
wherein in a case where the movement is present in the subject image, the processor sets the threshold value to become smaller as the area of the specific area where the movement is present becomes larger.

3. The imaging device according to claim 1,
wherein the processor specifies an area where the movement is present in the subject image, and
wherein in a case where the movement is present in the subject image, the processor sets the threshold value to become smaller as the area of the specific area where the movement is present becomes larger.

4. The imaging device according to claim 1,
wherein in a case where the movement is present in the subject image, the processor calculates, after the execution instruction is given, the defocus amount according to the execution instruction, and sets the threshold value to become larger as a time until the driving of the focus lens according to the defocus amount will be completed becomes longer.

5. The imaging device according to claim 1,
wherein in a case where the movement is present in the subject image, the processor calculates, after the execution instruction is given, the defocus amount according to the execution instruction, and sets the threshold value to become larger as a time until the driving of the focus lens according to the defocus amount will be completed becomes longer.

6. The imaging device according to claim 1,
wherein the processor separately detects a vertical movement of the subject image based on the movement in a vertical direction with respect to the imaging surface, of a subject imaged by the imaging element and a horizontal movement of the subject image based on the movement in a horizontal direction with respect to the imaging surface, of the subject imaged by the imaging element, and
wherein the processor drives, in a case where a vertical movement is detected, the focus lens according to the defocus amount calculated according to the execution instruction, performs the calculation of the defocus amount using the detection signal of the first signal detection pixel and the detection signal of the second signal detection pixel again, and compares the defocus amount with the threshold value to determine whether to perform the calculation of the defocus amount and the driving of the focus lens again.

7. The imaging device according to claim 1,
wherein the processor separately detects a vertical movement of the subject image based on the movement in a vertical direction with respect to the imaging surface, of a subject imaged by the imaging element and a horizontal movement of the subject image based on the movement in a horizontal direction with respect to the imaging surface, of the subject imaged by the imaging element, and
wherein the processor drives, in a case where a vertical movement is detected, the focus lens according to the defocus amount calculated according to the execution instruction, performs the calculation of the defocus amount using the detection signal of the first signal detection pixel and the detection signal of the second signal detection pixel again, and compares the defocus amount with the threshold value to determine whether to perform the calculation of the defocus amount and the driving of the focus lens again.

8. The imaging device according to claim 2,
wherein the processor separately detects a vertical movement of the subject image based on the movement in a vertical direction with respect to the imaging surface, of a subject imaged by the imaging element and a horizontal movement of the subject image based on the movement in a horizontal direction with respect to the imaging surface, of the subject imaged by the imaging element, and
wherein the processor drives, in a case where a vertical movement is detected, the focus lens according to the defocus amount calculated according to the execution instruction, performs the calculation of the defocus amount using the detection signal of the first signal detection pixel and the detection signal of the second signal detection pixel again, and compares the defocus amount with the threshold value to determine whether to perform the calculation of the defocus amount and the driving of the focus lens again.

9. The imaging device according to claim 3,
wherein the processor separately detects a vertical movement of the subject image based on the movement in a vertical direction with respect to the imaging surface, of a subject imaged by the imaging element and a horizontal movement of the subject image based on the movement in a horizontal direction with respect to the imaging surface, of the subject imaged by the imaging element, and
wherein the processor drives, in a case where a vertical movement is detected, the focus lens according to the defocus amount calculated according to the execution instruction, performs the calculation of the defocus amount using the detection signal of the first signal detection pixel and the detection signal of the second signal detection pixel again, and compares the defocus amount with the threshold value to determine whether to perform the calculation of the defocus amount and the driving of the focus lens again.

10. The imaging device according to claim 4,
wherein the processor separately detects a vertical movement of the subject image based on the movement in a vertical direction with respect to the imaging surface, of a subject imaged by the imaging element and a horizontal movement of the subject image based on the movement in a horizontal direction with respect to the imaging surface, of the subject imaged by the imaging element, and
wherein the processor drives, in a case where a vertical movement is detected, the focus lens according to the defocus amount calculated according to the execution instruction, performs the calculation of the defocus amount using the detection signal of the first signal detection pixel and the detection signal of the second signal detection pixel again, and compares the defocus amount with the threshold value to determine whether to perform the calculation of the defocus amount and the driving of the focus lens again.

11. The imaging device according to claim 5,
wherein the processor separately detects a vertical movement of the subject image based on the movement in a vertical direction with respect to the imaging surface, of a subject imaged by the imaging element and a horizontal movement of the subject image based on the movement in a horizontal direction with respect to the imaging surface, of the subject imaged by the imaging element, and
wherein the processor drives, in a case where a vertical movement is detected, the focus lens according to the defocus amount calculated according to the execution instruction, performs the calculation of the defocus amount using the detection signal of the first signal detection pixel and the detection signal of the second signal detection pixel again, and compares the defocus amount with the threshold value to determine whether to perform the calculation of the defocus amount and the driving of the focus lens again.

12. A focusing control method using the imaging device according to claim 1 comprising:
a focusing control step of calculating the defocus amount using the detection signal of the first signal detection pixel and the detection signal of the second signal detection pixel output from the imaging element that includes the first signal detection pixel that detects a signal based on one beam among the pair of beams that passes through different portions in a pupil region of the imaging optical system including the focus lens and the second signal detection pixel that detects a signal based on the other beam among the pair of beams, and images a subject through the imaging optical system, and driving the focus lens according to the defocus amount; and
a movement detection step of detecting whether the movement is present in a subject image captured by the imaging element,
wherein the focusing control step includes calculating the defocus amount according to the auto-focus execution instruction, driving, in a case where the defocus amount exceeds the threshold value, the focus lens according to the defocus amount and then performing calculating the defocus amount using the detection signal of the first signal detection pixel and the detection signal of the second signal detection pixel and driving the focus lens according to the defocus amount again to complete auto-focusing, driving, in a case where the defocus amount calculated according to the auto-focus execution instruction is equal to or smaller than the threshold value, the focus lens according to the defocus amount to complete auto-focusing, and setting the threshold value to a larger value in a case where the movement is present in the subject image than in a case where the movement is not present in the subject image.

13. The imaging device according to claim 1,
wherein the processor detects whether the movement is present in a subject image captured by the imaging element, prior to the calculation of the defocus amount by the processor and driving of the focus lens according to the defocus amount.

14. The imaging device according to claim 1,
wherein the processor detects whether the movement is present in a subject image captured by the imaging element, prior to the calculation of the defocus amount by the processor and driving of the focus lens according to the defocus amount.

15. The imaging device according to claim 2,
wherein the processor detects whether the movement is present in a subject image captured by the imaging element, prior to the calculation of the defocus amount by the processor and driving of the focus lens according to the defocus amount.

16. The imaging device according to claim 3,
wherein the processor detects whether the movement is present in a subject image captured by the imaging element, prior to the calculation of the defocus amount by the processor and driving of the focus lens according to the defocus amount.

17. The imaging device according to claim 4,
wherein the processor detects whether the movement is present in a subject image captured by the imaging element, prior to the calculation of the defocus amount by the processor and driving of the focus lens according to the defocus amount.

18. The imaging device according to claim 5,
wherein the processor detects whether the movement is present in a subject image captured by the imaging element, prior to the calculation of the defocus amount by the processor and driving of the focus lens according to the defocus amount.

19. The imaging device according to claim 6,
wherein the processor detects whether the movement is present in a subject image captured by the imaging element, prior to the calculation of the defocus amount by the processor and driving of the focus lens according to the defocus amount.

\* \* \* \* \*